United States Patent [19]

van Konynenburg et al.

[11] 4,237,441

[45] Dec. 2, 1980

[54] LOW RESISTIVITY PTC COMPOSITIONS

[75] Inventors: Peter V. van Konynenburg, Palo Alto; Andrew Au, Fremont; Chris Rauwendaal, Menlo Park; Alan J. Gotcher, Saratoga, all of Calif.

[73] Assignee: Raychem Corporation, Menlo Park, Calif.

[21] Appl. No.: 965,343

[22] Filed: Dec. 1, 1978

[51] Int. Cl.³ .............................................. H01C 7/02
[52] U.S. Cl. .................................... 338/22 R; 29/610; 252/511; 338/223; 338/225
[58] Field of Search ......... 219/505; 338/22 R, 22 SD, 338/223, 225; 252/511; 29/610

[56] References Cited

U.S. PATENT DOCUMENTS

| | | | |
|---|---|---|---|
| 2,978,665 | 4/1961 | Vernet et al. | 252/511 X |
| 3,243,753 | 3/1966 | Kohler | 338/31 |
| 3,697,450 | 10/1972 | Takanaka | 252/511 |
| 3,760,495 | 9/1973 | Meyer | 29/610 |
| 3,858,144 | 12/1974 | Bedard et al. | 219/505 X |
| 3,974,105 | 8/1976 | Sato et al. | 338/25 X |
| 4,100,087 | 7/1978 | Takayama et al. | 252/511 X |
| 4,124,747 | 11/1978 | Murer et al. | 252/511 X |

*Primary Examiner*—C. L. Albritton
*Attorney, Agent, or Firm*—Lyon & Lyon

[57] ABSTRACT

Compositions which exhibit PTC behavior with a switching temperature ($T_s$) above 0° C., which have a resistivity at a temperature below $T_s$ of less than 7 ohm. cm, and which comprise a crystalline polymer and a particulate filler component which comprises carbon black having a particle size, D, which is from 20 to 150 millimicrons and a surface area S in m²/gram such that S/D is not more than 10. The composition preferably has a peak resistivity of at least 1000 ohm. cm and is electrically stable when aged at elevated temperature. The quantity $$\frac{S}{D} \times \frac{\text{volume of filler component}}{\text{volume of polymer}}$$

is preferably less than 1, especially less than 0.5. Shaped articles of such compositions are prepared by a process in which the carbon black is dispersed in the molten polymer and the dispersion is then melt-shaped, the total energy used in preparing and melt-shaping the dispersion being 1 to 300 hp. hr. ft$^{-3}$, preferably 1 to 100 hp. hr. ft$^{-3}$, especially 1 to 50 hp. hr. ft$^{-3}$. The compositions are particularly useful in circuit protection devices.

43 Claims, No Drawings

LOW RESISTIVITY PTC COMPOSITIONS

CROSS-REFERENCE TO RELATED APPLICATIONS

This application Ser. No. 965,344 is related to the application of Middleman et al entitled Circuit Protection Devices and the application Ser. No. 965,345 of Middleman et al entitled PTC devices comprising Oxygen Barrier Layers, both filed contemporaneously with this application.

BACKGROUND OF THE INVENTION

1. Field of the Invention

This invention relates to conductive polymer compositions, their preparation, and devices comprising them.

2. Summary of the Prior Art

It is known that polymers, including crystalline polymers, can be made electrically conductive by dispersing therein suitable amounts of finely divided conductive fillers. Some conductive polymers exhibit what is known as PTC (positive temperature coefficient) behavior. The term "PTC" has been used in various different ways in the past, but in this specification, the terms "composition exhibiting PTC behavior" and "PTC" composition" are used to denote a composition which has an $R_{14}$ value of at least 2.5 and an $R_{100}$ value of at least 10, and preferably has an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. A plot of the log of the resistance of a PTC element (i.e. an element composed of a PTC composition) against temperature will often show a sharp change in slope over a part of the temperature range in which the composition has an $R_{100}$ value of at least 10. The term "switching temperature" (usually abreviated to $T_s$) is used herein to denote the temperature at the intersection point of extensions of the substantially straight portions of such a plot which lie either side of the portion showing the sharp change in slope. The term "peak resistivity" is used herein to denote the maximum resistivity which the composition exhibits above $T_s$, and the term "peak temperature" is used to denote the temperature at which the composition has its peak resistivity.

Recent research relating to conductive polymers is described in, for example, U.S. Pat. No. 3,858,144, co-pending and commonly assigned Applications Ser. Nos. 601,638 (Horsma et al), 750,149 (Kamath et al), 751,095 (Toy et al), 798,154 (Horsma), 873,676 (Horsma) and 943,659 (van Konynenburg), and the application Ser. No. 965,344 of Middleman et al. entitled Circuit Protection Devices comprising PTC elements and the application Ser. No. 965,345 of Middleman et al entitled PTC Devices Comprising Oxygen Barrier Layers, both filed contemporaneously with this application. The disclosures of this patent and these applications are incorporated by reference herein.

Particularly useful known PTC compositions comprise a thermoplastic crystalline polymer with carbon black dispersed therein. The polymers which have been used include polyolefins, e.g. polyethylene, and copolymers of olefins and polar comonomers. Generally the composition is cross-linked, preferably by irradiation at room temperature, to improve its stability at temperatures above $T_s$. At present, the only commercial use of such compositions is in self-regulating heaters, and for this use, the compositions must have a relatively high resistivity at room temperature, usually at least $10^3$ ohm. cm. It has been recognised that there are important potential uses for PTC conductive polymer compositions having much lower resistivities at room temperatures, e.g. below 10 ohm. cm, preferably below 7 ohm. cm, especially such compositions which are electrically stable when exposed to elevated temperature. [See for example U.S. Pat. Nos. 2,978,665 (Vernet et al) and U.S. Pat. No. 3,243,753 (Kohler)]. However, the preparation of such compositions has presented very serious problems. For example, it has been found that as the content of conductive filler in a PTC conductive polymer composition has been increased, in order to reduce the resistivity of the composition, there has been a sharp reduction in the intensity of the PTC effect [see for example M. Narkis et al, Poly Eng and Sci, 18, 649 (1978)]. In addition, it has been found that when PTC conductive polymer compositions are exposed to elevated temperatures, their resistivity increases sharply [see for example J. Meyer, Poly Eng and Sci., 14, 706 (1974)].

SUMMARY OF THE INVENTION

We have discovered that in order to produce a PTC composition which has a resistivity below 7 ohm. cm and which comprises a crystalline polymer having carbon black dispersed therein, it is essential that the polymer should have at least 10% crystallinity and that the carbon black should have a particle size, D, which is from 20 to 150 millimicrons and a surface area, S, in $m^2$/gram such that S/D is not more than 10; when the polymer has low crystallinity, the carbon black preferably has a large particle size. [Crystallinities given herein are measured by X-ray crystallography. The values of surface area, S, given herein are measured by the well-known nitrogen adsorption method, and for details of the measurement of D and S, reference should be made to "Analysis of Carbon Black" by Schubert, Ford and Lyon, Vol. 8, Encyclopaedia of Industrial Chemical Analysis (1969), 179, published by John Wiley and Son, New York.]

We have also discovered that the ratio by volume of the filler (i.e. the carbon black and any other particulate filler in the composition) to the polymer has an important influence on the electrical characteristics of the composition, and that this ratio should preferably be correlated with the S/D ratio referred to above so that the quantity $$\frac{S}{D} \times \frac{\text{volume of filler component}}{\text{volume of polymer component}}$$

is less than 1.

We have further discovered that the method used to disperse the carbon black in the polymer and to shape the composition, and in particular the power consumed in the method, has an important influence on the electrical characteristics of the composition. If the power consumption is too great, the composition tends to have too high a resistivity at temperatures below $T_s$ and/or to have unsatisfactory electrical stability on aging at elevated temperatures; on the other hand, if the power consumption is too low, this also can result in a composition which exhibits unsatisfactory PTC behavior.

By following the teachings of this specification, as outlined above and further described below, it is possible for the first time to prepare conductive polymer compositions which exhibit PTC behavior with a $T_s$ above 0° C., which have a resistivity of less than 7 ohm. cm at at least one temperature between $T_s$ and $-40°$ C., and which have a peak resistivity above 1000 ohm. cm and/or exhibit satisfactory electrical stability on aging at elevated temperatures.

In one aspect the invention provides a conductive polymer composition which exhibits PTC behavior with a switching temperature $T_s$ above 0° C., which has a resistivity of less than 7 ohm. cm at at least one temperature between $T_s$ and $-40°$ C.; and which comprises (1) a polymer component having at least 10% crystallinity and (2) a particulate filler component which has been dispersed in said polymer component and which comprises carbon black having a particle size, D, which is from 20 to 150 millimicrons and a surface area, S, in m²/gram such that S/D is not more than 10; the amount of said filler component being such that the quantity $$\frac{S}{D} \times \frac{\text{volume of filler component}}{\text{volume of polymer component}}$$

is less than 1.

In another aspect the invention provides a conductive polymer composition which exhibits PTC behavior with a switching temperature $T_s$ above 0° C., which has a resistivity of less than 7 ohm. cm at at least one temperature between $T_s$ and $-40°$ C., and which, after having been subjected to a thermal aging treatment which consists of maintaining the composition, by external heating thereof, for 25 hours at a temperature at which the resistivity of the composition is between 100 ohm. cm and the peak resistivity, (a) exhibits PTC behavior, and (b) has a resistivity at at least one temperature between $T_s$ and $-40°$ C. which is between 0.5 times and 2 times the resistivity of the composition at the same temperature before said thermal aging treatment, and which composition comprises (1) a polymer component having at least 10% crystallinity and (2) a particulate filler component which has been dispersed in said polymer component and which comprises carbon black having a particle size, D, which is from 20 to 150 millimicrons and a surface area, S, in m²/gram such that S/D is not more than 10.

In another aspect the invention provides a conductive polymer composition which exhibits PTC behavior with a switching temperature, $T_s$, above 0° C., which has a resistivity of less than 7 ohm. cm at at least one temperature between $T_s$ and $-40°$ C. and a peak resistivity of at least 1000 ohm. cm and which comprises (1) a polymer component having at least 10% crystallinity and (2) a particulate filler component which has been dispersed in said polymer component and which comprises carbon black having a particle size, D, which is from 20 to 150 microns and a surface area, S, in m²/gram such that S/D is not more than 10.

The compositions of the invention are preferably in the form of shaped articles which have been prepared by a process which includes a melt-shaping step, e.g. extrusion or molding.

In another aspect the invention includes an electrical device which comprises a PTC element composed of a conductive polymer composition as defined above and at least two electrodes which can be connected to a source of electrical power to cause current flow through said PTC element.

The invention further includes a process for preparing a shaped article of a conductive polymer composition as defined above, which process comprises (1) providing
   (a) a polymer component having at least 10% crystallinity, and
   (b) a carbon black having a particle size, D, which is from 20 to 150 millimicrons and a surface area (S), in m²/gram such that S/D is not more than 10

(2) preparing a composition which comprises a dispersion of said carbon black in said polymer component by a process which comprises dispersing said carbon black in said polymer component while said polymer component is molten; and (3) melt-shaping said composition; the total energy used in steps (2) and (3) being from 1 to 300 hp. hr. ft$^{-3}$.

DETAILED DESCRIPTION OF THE INVENTION

The polymer component used in the present invention may be a single polymer or a mixture of two or more different polymers. It must have at least 10% crystallinity, and since greater crystallinity favors more intense PTC behavior, its crystallinity is preferably more than 20%, especially more than 40%. Suitable polymers include polyolefins, especially polymers of one or more α-olefins, e.g. polyethylene, polypropylene and ethylene/propylene copolymers; copolymers of one or more α-olefins, e.g. ethylene, with one or more polar copolymers, e.g. vinyl acetate, acrylic acid, ethyl acrylate and methyl acrylate; polyarylenes, e.g. poly arylene ether ketones and sulfones and polyphenylene sulfide; polyesters, including polyactones, e.g. polybutylene terephthalate, polyethylene terephthalate and polycaprolactone; polyamides; polycarbonates; and fluorocarbon polymers, i.e. polymers which contain at least 10%, preferably at least 20%, by weight of fluorine, e.g. polyvinylidene fluoride, polytetrafluoroethylene, fluorinated ethylene/propylene copolymers, and copolymers of ethylene and a fluorine-containing comonomer, e.g. tetrafluoroethylene, and optionally a third comonomer. We have obtained excellent results with a mixture of polyethylene, preferably high density polyethylene, and a copolymer of ethylene and a polar copolymer, preferably acrylic acid. A particularly preferred polymer component comprises 25 to 75% by weight of high density polyethylene and 2 to 75% by weight of an ethylene/acrylic acid copolymer, in which the percent by weight of acrylic acid is preferably 4 to 10%.

The carbon black used in the present invention must have a particle size, D, of 20 to 150 millimicrons, and a surface area, S, in m²/gram such that S/D is not more than 10. Mixtures of carbon blacks can be used. If a polymer having relatively low crystallinity is used, then the use of a carbon black having a relatively large particle size and a relatively low value of S/D is preferred in order to obtain an intense PTC effect. However, for many polymers, carbon blacks having a particle size of 20 to 75 millimicrons give satisfactory results. A particle size greater than 30 millimicrons is preferred, and for polymers having less than 40% crystallinity, a particle size greater than 60 millimicrons is preferred. As the particle size of the carbon black gets larger, it becomes more difficult to obtain a composition having low resistivity combined with satisfactory PTC behavior, and it is therefore preferred to use a carbon black having a particle size less than about 100 millimicrons.

The amount of carbon black in the composition should be such that the composition has a resistivity less than 7 ohm. cm, preferably less than 5 ohm. cm, especially less than 2 ohm. cm, particularly less than 1 ohm. cm, at a temperature between $-40°$ C. and $T_s$, and preferably at $20°$ C. The amount needed to achieve such resistivity, in combination with the desired PTC behavior, will depend on the polymer component, the carbon black and any other particulate filler present, and the method used to prepare and shape the composition. The ratio by volume of the carbon black to the polymer component is generally at least 0.15 and preferably at least 0.25, and can be substantially greater, e.g. at least 0.40 or 0.50.

The composition may contain other particulate fillers in addition to the carbon black, for example non-conductive inorganic or organic fillers, e.g. zinc oxide, antimony trioxide or clay. The term "filler component" is used herein to denote all the particulate fillers in the composition. We have found that in order to obtain a composition which has desirable electrical characteristics, the value of the quantity $$\frac{S}{D} \times \frac{\text{volume of filler component}}{\text{volume of polymer component}}$$

is preferably less than 1.0, more preferably less than 0.5, particularly less than 0.4, especially less than 0.3.

The composition preferably comprises an antioxidant or other additive which will stabilise the composition against degradation, e.g. thermo-oxidative degradation, the amount of such additive generally being 0.005 to 10%, preferably 0.5 to 4%, by weight, based on the weight of the polymer. Preferably the additive is an organic antioxidant, for example a hindered phenol such as those disclosed in U.S. Pat. No. 3,986,981 (Lyons) and those manufactured by Ciba Geigy under the trade name Irganox. The choice of antioxidant will of course be dependent on the polymer, and it is important to note also that some materials which are generally useful as antioxidants cause the electrical properties of the composition to become less stable on exposure to elevated temperatures.

When the composition is to be cross-linked it may also contain a compound which can be decomposed by heat to initiate cross-linking, or a compound which promotes cross-linking when the composition is irradiated.

The peak resistivity of the compositions of the invention is preferably at least 1,000 ohm. cm, more preferably at least 5,000 ohm. cm, particularly at least 10,000 ohm. cm, especially at least 50,000 ohm. cm.

For many uses of the compositions of the invention, it is desirable that the composition, after having been subjected to a thermal aging treatment which consists of maintaining the composition, by external heating thereof, for 25 hours at a temperature at which the resistivity of the composition is between 100 ohm. cm and the peak resistivity,
(a) exhibits PTC behavior, and
(b) has a resistivity at at least one temperature between $T_s$ and $-40°$ C., and preferably at all temperatures between $T_s$ and $-40°$ C., which is between 0.5 times and 2 times the resistivity of the composition at the same temperature before said thermal aging.

Preferably the composition has these properties after thermal aging as defined for 40 hours, and especially after thermal aging as defined for 50 hours. It is also preferred that the composition, after such thermal aging, has a peak resistivity of at least 1,000 ohm. cm, more preferably at least 5,000 ohm. cm, particularly at least 10,000 ohm. cm, especially at least 50,000 ohm. cm.

The thermal aging treatment referred to above is a passive treatment, and some compositions which show satisfactory resistance stability, when subjected to such aging, deteriorate relatively quickly when aged under active conditions, i.e. at elevated temperature caused by $I^2R$ heating. It is, therefore, preferred that the composition, after having been subjected to a voltage aging treatment which consists of passing current through the composition for 25 hours so that $I^2R$ heating thereof maintains the composition at a temperature between $T_s$ and $(T_s+50)°$ C.
(a) exhibits PTC behavior; and
(b) has a resistivity at at least one temperature between $T_s$ and $-40°$ C., and preferably at all temperatures between $T_s$ and $-40°$ C., which is between 0.5 times and 2 times the resistivity of the composition at the same temperature before said voltage aging.

Preferably the composition has these properties after voltage aging as defined for 40 hours, and especially after voltage aging as defined for 50 hours. It is also preferred that the composition, after such voltage aging, has a peak resistivity of at least 1,000 ohm. cm, more preferably at least 5,000 ohm. cm, particularly at least 10,000 ohm. cm, especially at least 50,000 ohm. cm.

As indicated above we have found that the method used to disperse the carbon black (and any other particulate filler) in the polymer component, and the way in which the composition is shaped, can have a profound influence on the electrical characteristics of the product. This is in marked contrast to prior art teachings that if the carbon black is adequately mixed with the polymer component, the resistivity of the composition is dependent on the proportion of carbon black. We have found that the total energy used in preparing and melt-shaping the composition should be from 1 to 300 hp. hr. per cubic foot of the composition, and is preferably 1 to 100, particularly 1 to 50, especially 1 to 25, hp. hr. ft$^{-3}$. Although any method can be used to disperse the filler component in the polymer component, the methods of most practical interest comprise subjecting a mixture of the solid polymer and the filler component to mechanical shear working (and optionally also to external heating) which causes the polymer to melt and disperses the filler in the molten polymer. The dispersion can be carried out in, for example, a Banbury mixer, a roll mill or a single screw or twin screw extruder. The dispersion may be extruded directly into the final shaped form desired or may be removed from the mixer in any convenient way, chopped into small pieces, and subsequently melt-shaped, e.g. by extrusion, molding or sintering.

The carbon black should be dispersed sufficiently to give a composition which has substantially uniform electrical properties, and up to a certain point an increase in the power consumed in the process often results in a composition which shows more intense PTC effect. On the other hand, if the power consumed in the process is too great, this can cause the composition to be electrically unstable when aged at elevated temperatures and/or can cause the composition to have too high a resistivity at temperatures below $T_s$.

The invention is illustrated by the following Examples, which are summarised in Tables I, II, III and IV below. Table I shows the ingredients and methods used in preparing the various samples. In Table I, the polymers are identified by type, trade name, crystalline melting point ($T_M$) and percent crystallinity (cryst %) and the amount thereof in weight percent of the composition. The abbreviations used in the TYPE column are further identified below:

HDPE—high density polyethylene
LDPE—low density polyethylene
MDPE—medium density polyethylene
EAA—copolymer of ethylene and acrylic acid
PP—polypropylene
$PVF_2$—polyvinylidene fluoride
PB—poly-1-butene
FEP—fluorinated ethylene/propylene copolymer Table I also identifies the carbon blacks used by trade name, particle size in millimicrons (D), surface area in $m^2$/gram (S) and the amount thereof in weight percent of the composition; the ratio S/D is also given for each black. The ratio by volume of carbon black to polymer (RATIO CB/POLY) is also given in Table I.

Table I also shows any materials present in the composition in addition to the polymer(s) and carbon black. These additives are identified by type and name and the amount thereof in weight percent of the composition. The abbreviations used in the TYPE column are further identified below:

AO—antioxidant, the antioxidant used being, except where otherwise noted in the NAME column, an oligomer of 4,4'-thiobis (3-methyl-6-t-butyl phenol) with an average degree of polymerisation of 3-4, as described in U.S. Pat. No. 3,986,981
CXA—cross-linking agent
Acid—acid scavenger
XLA—cross-linking agent
FR—fire retardant The abbreviations used in the NAME column are further identified below.
130XL—Peroxide cross-linking agent (Luperco 130XL)
ARD—Agerite Resin D
Ca $CO_3$—calcium carbonate
Irganox 1010—tetrakis [methylene (3,5-di-tert.butyl-4-hydroxy-hydrocinnamate)] methane
TAIC—triallyl isocyanurate
Santovar A —2,5-di-tert.amyl hydroquinone
Dechlorane—decachlorobiphenyl
$Sb_2 O_3$—antimony trioxide Table I also identifies the particular fabrication technique used to mix and shape the ingredients together (FAB TECH), the process temperature in °C. (PROC TEMP), the process time in minutes (PROC TIME) and the total amount of energy in hp. hr. $ft^{-3}$ used in the fabrication (SHEAR HISTORY). The abbreviations used in the FAB TECH column are further identified below.

BAN—Suitable amounts of the specified ingredients (e.g. in Examples IA and IB, 1504.8 g of the high density polyethylene, 1208.4 g of the carbon black and 22.8 g of the antioxidant) were mixed at flux temperature for 5 minutes in a steam-heated Banbury mixer having a water-cooled rotor. The mixture was dumped from the mixer, cooled and chopped into small pieces. Part of the chopped mixture was compression molded at 180° C. and a pressure of 1,000 psi for 5 minutes into a slab about 0.04 inch thick. Rectangular samples 1.0×1.5 inch were cut from the slab. In those Examples in which the sample was irradiated, as indicated in Table I and further discussed below, the sample was irradiated to the specified dosage to cross-link the composition. Silver electrodes were provided on the samples by painting 0.25×1.0 inch strips of a silver-epoxy composition (Electrodag 504) on each end of the sample. The samples were thermally conditioned by maintaining them at 60° C. for 15 minutes by external heating and then cooling to room temperature at a rate of 1° C./minute.

MILL—Suitable amounts of the specified ingredients were mixed at flux temperature in a 3 inch electrically heated roll mill. The mixture was sheeted from the mill, cooled and chopped into small pieces. Part of the chopped mixture was compression molded at a suitable temperature and 1,000 psi pressure for 3 minutes into a slab about 0.024 inch thick. Rectangular samples 1.0×1.5 inch were cut from the slab. After irradiation where specified, silver electrodes were provided on the samples as described in BAN. The samples were then thermally conditioned by maintaining them at a temperature of $(T_M+30)$° C. for 15 minutes by external heating and then cooling to room temperature at a rate of 1° C./minute.

BRA—Suitable amounts of the specified ingredients were mixed in a counter-rotating twin screw mixer (a Brabender Plastograph) and the mixture dumped, cooled and chopped into small pieces. Samples were prepared from the chopped mixture as described in MILL above.

ZSK—Suitable amounts of the specified ingredients were mixed in a co-rotating twin screw extruder (a ZSK extruder) and the mixture extruded as a strand. The strand was cooled and chopped into small pieces. Samples were prepared from the chopped mixture as described in MILL above.

Table I also shows the radiation dosage in megarads (RAD DOSE) for those samples which were cross-linked by irradiation, and the temperature in °C. and time in minutes of heating to cause cross-linking of those samples which were cross-linked by chemical cross-linking agents (CHEM XL T, t). Where the radiation dose was 20 megarads, the sample was irradiated first on one side to a dose of 10 megarads and then on the other side to a dose of 10 megarads.

Table II below shows the value of the quantity $$\frac{S}{D} \times \frac{\text{volume of filler component}}{\text{volume of polymer component}}$$

and the resistivity/temperature characteristics of the various samples. The resistivities given in Table II were calculated from resistance measurements taken on the thermally conditioned samples as they were externally heated from room temperature at a rate of 1° C./minute, and the various abbreviations in Table II are further identified below $\rho_{20}$—resistivity at 20° C. in ohm. cm
$\rho_p$—peak resistivity in ohm. cm
$T_{2x}$—the temperature in °C. at which the resistivity is twice the resistivity at 20° C.
$T_s$—the switching temperature in °C.
$T_p$—the peak temperature in °C.

Table III below shows, for a number of the samples, the effect on resistivity of thermal aging at elevated temperature. Table III shows, in the columns headed ORIGINAL PERFORMANCE, the resistivity at 20° C. ($\rho_{20}$) of the samples which had been externally heated at a rate of 1° C./min to obtain the data in Table II and then cooled to 20° C., and the peak resistivity of these samples when again externally heated at 1° C./min ($\rho_p$). The samples were then cooled to room temperature and reheated to the temperature T shown in Table III, and the resistivity at this temperature is given in the column headed $\rho_T$. The samples were maintained at this temperature for 52 or 73 hours, with intervals after 2 hours, 9 hours and 27 hours, and for the samples aged for 73 hours after 46 hours, in which intervals the samples were cooled to 20° C. and their resistivity measured before being reheated to temperature T. The resistivities of the samples at 20° C. after aging at temperature T for the indicated time are given in the columns headed $\rho$, together with the percent change in resistivity at 20° C., namely the value of $$\frac{\rho - \rho_{20}}{\rho_{20}} \times 100$$

Table IV below shows, for a number of samples, the effect on resistivity of voltage aging at elevated temperature. These samples were prepared by taking a part of the chopped mixture of the indicated example and compression molding it at 180° C. and a pressure of 1,000 psi for 5 minutes into a slab 0.080 inch thick; a round disc, 0.75 inch in diameter, was punched out of the slab; an electrode was formed on the face of each disk by molding into it a disc 0.75 inch in diameter cut from an expanded metal mesh composed of nickel-plated copper; the sample was irradiated to 20 megarads; and 20 AWG leads were attached to the electrodes. The samples were thermally conditioned by maintaining them at ($T_M+30$)° C. for 15 minutes by external heating and then cooling to room temperature at a rate of 1° C. per minute. The resistivity of the material was measured at 20° C. The leads of the device were then attached to a variable voltage AC power supply. The voltage of the supply was maintained at 120 volts except when the device was first connected or reconnected to the power supply, when the voltage was 30-35 volts for the first 30 seconds and was then increased to 120 volts over a period of 2 minutes. The samples were aged under these conditions for 30 or 50 hours, with intervals after 5, 10, 20 or 30 hours, in which intervals the samples were cooled to 20° C. and their resistivity measured before re-applying the voltage. The resistivities of the samples at 20° C. after aging under these conditions for the indicated time are given in the columns headed $\rho$, together with the percent change in resistivity.

Similar voltage aging tests carried out on the compositions of Examples 40, 54, 56 63, 65, 85, 91 and 93 showed that the compositions of Examples 54, 56 and 65 were stable under voltage aging, their resistivity increasing less than twice after 30 hours of aging, whereas the compositions of Examples 40, 63 85, 91 and 93 were not stable, their resistivity increasing more than 10 times after 30 hours of aging.

TABLE I

INGREDIENTS AND PROCESS CONDITIONS UTILIZED TO FABRICATE PTC COMPOSITIONS

| EX. NO. | POLYMER | | | | | | | | | |
|---|---|---|---|---|---|---|---|---|---|---|
| | TYPE | NAME | $T_M$ °C. | CRYST. % | AMT Wt % | TYPE | NAME | $T_M$ °C. | CRYST. % | AMT Wt % |
| 1A | HDPE | MARLEX 6003 | 135 | 70-90 | 66.0 | — | — | — | — | — |
| 1B | HDPE | MARLEX 6003 | 135 | 70-90 | 66.0 | — | — | — | — | — |
| 2 | HDPE | MARLEX 6003 | 135 | 70-90 | 70.0 | — | — | — | — | — |
| 3 | HDPE | MARLEX 6003 | 135 | 70-90 | 70.0 | — | — | — | — | — |
| 4 | HDPE | MARLEX 6003 | 135 | 70-90 | 54.5 | — | — | — | — | — |
| 5 | HDPE | MARLEX 6003 | 135 | 70-90 | 54.5 | — | — | — | — | — |
| 6 | HDPE | MARLEX 6003 | 135 | 70-90 | 64.4 | — | — | — | — | — |
| 7 | HDPE | MARLEX 6003 | 135 | 70-90 | 64.4 | — | — | — | — | — |
| 8 | HDPE | MARLEX 6003 | 135 | 70-90 | 59.4 | — | — | — | — | — |
| 9 | HDPE | MARLEX 6003 | 135 | 70-900 | 59.4 | — | — | — | — | — |
| 10 | HDPE | MARLEX 6003 | 135 | 70-90 | 64.4 | — | — | — | — | — |
| 11 | HDPE | MARLEX 6003 | 135 | 70-90 | 66.0 | — | — | — | — | — |
| 12 | HDPE | MARLEX 6003 | 135 | 70-90 | 60.8 | — | — | — | — | — |
| 13 | HDPE | MARLEX 6003 | 135 | 70-90 | 59.6 | — | — | — | — | — |
| 14 | HDPE | ALATHON 7030 | 135 | 70-90 | 46.0 | — | — | — | — | — |
| 15 | HDPE | ALATHON 7030 | 135 | 70-90 | 46.0 | — | — | — | — | — |
| 16 | HDPE | MARLEX 6003 | 135 | 70-90 | 24.0 | EAA | 449 | 106 | 10-30 | 30 |
| 17 | HDPE | MARLEX 6003 | 135 | 70-90 | 64.3 | — | — | — | — | — |
| 18 | HDPE | MARLEX | 135 | 70-90 | 64.3 | — | — | — | — | — |

TABLE I-continued
INGREDIENTS AND PROCESS CONDITIONS UTILIZED TO FABRICATE PTC COMPOSITIONS

| | | | | | | | | | | |
|---|---|---|---|---|---|---|---|---|---|---|
| 19 | HDPE | MARLEX 6003 | 135 | 70-90 | 61.4 | — | — | — | — | — |
| 20 | HDPE | MARLEX 6003 | 135 | 70-90 | 61.4 | — | — | — | — | — |
| 21 | HDPE | MARLEX 6003 | 135 | 70-90 | 67.3 | — | — | — | — | — |
| 22 | HDPE | MARLEX 6003 | 135 | 70-90 | 67.3 | — | — | — | — | — |
| 23 | HDPE | MARLEX 6003 | 135 | 70-90 | 58.2 | — | — | — | — | — |
| 24 | HDPE | MARLEX 6003 | 135 | 70-90 | 58.2 | — | — | — | — | — |
| 25 | HDPE | MARLEX 6003 | 135 | 70-90 | 58.2 | — | — | — | — | — |
| 26 | HDPE | MARLEX 6003 | 135 | 70-90 | 58.2 | — | — | — | — | — |
| 27 | HDPE | MARLEX 6003 | 135 | 70-90 | 65.4 | — | — | — | — | — |
| 28 | HDPE | MARLEX 6003 | 135 | 70-90 | 65.4 | — | — | — | — | — |
| 29 | HDPE | MARLEX 6003 | 135 | 70-90 | 58.0 | — | — | — | — | — |
| 30 | HDPE | MARLEX 6003 | 135 | 70-90 | 58.0 | — | — | — | — | — |
| 31 | HDPE | MARLEX 6003 | 135 | 70-90 | 64.0 | — | — | — | — | — |
| 32 | HDPE | MARLEX 6003 | 135 | 70-90 | 64.0 | — | — | — | — | — |
| 33 | HDPE | MARLEX 6003 | 135 | 70-90 | 63.0 | — | — | — | — | — |
| 34 | HDPE | MARLEX 6003 | 135 | 70-90 | 63.0 | — | — | — | — | — |
| 35 | HDPE | MARLEX 6003 | 135 | 70-90 | 58.0 | — | — | — | — | — |
| 36 | HDPE | MARLEX 6003 | 135 | 70-90 | 58.0 | — | — | — | — | — |
| 37 | HDPE | MARLEX 6003 | 135 | 70-90 | 24.0 | — | — | — | — | — |
| 38 | HDPE | MARLEX 6003 | 135 | 70-90 | 24.0 | — | — | — | — | — |
| 39 | HDPE | MARLEX 6003 | 135 | 70-90 | 52.5 | — | — | — | — | — |
| 40 | HDPE | MARLEX 6003 | 135 | 70-90 | 52.5 | — | — | — | — | — |
| 41 | HDPE | MARLEX 6003 | 135 | 70-90 | 58.8 | — | — | — | — | — |
| 42 | HDPE | MARLEX 6003 | 135 | 70-90 | 60.0 | — | — | — | — | — |
| 43 | HDPE | MARLEX 6003 | 135 | 70-90 | 65.0 | — | — | — | — | — |
| 44 | HDPE | MARLEX 6003 | 135 | 70-90 | 65.0 | — | — | — | — | — |
| 45 | HDPE | MARLEX 6003 | 135 | 70-90 | 63.0 | — | — | — | — | — |
| 46 | HDPE | MARLEX 6003 | 135 | 70-90 | 63.0 | — | — | — | — | — |
| 47 | HDPE | MARLEX 6003 | 135 | 70-90 | 85.0 | — | — | — | — | — |
| 48 | HDPE | MARLEX 6003 | 135 | 70-90 | 85.0 | — | — | — | — | — |
| 49 | HDPE | MARLEX 6003 | 135 | 70-90 | 82.5 | — | — | — | — | — |
| 50 | HDPE | MARLEX 6003 | 135 | 70-90 | 82.5 | — | — | — | — | — |
| 51 | HDPE | MARLEX 6003 | 135 | 70-90 | 21.1 | PP | PROFAX 8523 | 165 | 30-60 | 36.9 |
| 52 | HDPE | MARLEX 6003 | 135 | 70-90 | 21.1 | PP | PROFAX 8523 | 165 | 30-60 | 36.9 |
| 53 | LDPE | DYNH-1 | 109 | 40-60 | 22.67 | EAA | SURLYN 1652 | 102 | 10-30 | 28.23 |
| 54 | LDPE | DYNH-1 | 109 | 40-60 | 22.67 | EAA | SURLYN 1652 | 102 | 10-30 | 28.23 |
| 55 | MDPE | GULF 2604 | 118 | 50-80 | 24.0 | EAA | EAA455 | 106 | 10-30 | 30.0 |
| 56 | MDPE | GULF 2604 | 118 | 50-80 | 24.0 | EAA | EAA455 | 106 | 10-30 | 30.0 |
| 57 | HDPE | MARLEX 6003 | 135 | 70-90 | 32.4 | PP | PROFAX 8623 | 165 | 30-60 | 31.4 |
| 58 | HDPE | MARLEX 6003 | 135 | 70-90 | 30.4 | PB | WITRON 100 | 124 | 30-55 | 30.4 |

TABLE I-continued

INGREDIENTS AND PROCESS CONDITIONS UTILIZED TO FABRICATE PTC COMPOSITIONS

| | | | | | | | | | | | |
|---|---|---|---|---|---|---|---|---|---|---|---|
| 59 | HDPE | MARLEX 6003 | 135 | 70–90 | 30.4 | PB | WITRON 100 | 124 | 30–55 | 30.4 |
| 60 | HDPE | ALATHON 7040 | 135 | 70–90 | 34.7 | FEP | FEP 100 | 275 | 40 | 30.6 |
| 61 | HDPE | ALATHON 7040 | 135 | 70–90 | 34.7 | FEP | FEP 100 | 275 | 40 | 30.6 |
| 62 | MDPE | GULF 2604 | 118 | 50–80 | 52.0 | — | — | — | — | — |
| 63 | MDPE | GULF 2604 | 118 | 50–80 | 52.0 | — | — | — | — | — |
| 64 | EAA | EAA 455 | 106 | 10–30 | 47.0 | — | — | — | — | — |
| 65 | EAA | EAA 455 | 106 | 10–30 | 47.0 | — | — | — | — | — |
| 66 | HDPE | ALATHON 7030 | 106 | 10–30 | 53.2 | — | — | — | — | — |
| 67 | HDPE | ALATHON 7030 | 106 | 10–30 | 53.2 | — | — | — | — | — |
| 68 | LDPE | DYNH-1 | 109 | 40–60 | 52.0 | — | — | — | — | — |
| 69 | LDPE | DYNH-1 | 109 | 40–60 | 52.0 | — | — | — | — | — |
| 70 | PP | PROFAX 6523 | 165 | 30–60 | 52.0 | — | — | — | — | — |
| 71 | PP | PROFAX 6523 | 165 | 30–60 | 52.0 | — | — | — | — | — |
| 72 | $PVF_2$ | KYNAR 461 | 165 | 40 | 72.0 | Rubber | VITON A-HV | | | 6.0 |
| 73 | $PVF_2$ | KYNAR 461 | 165 | 40 | 72.0 | Rubber | VITON A-HV | | | 6.0 |
| 74 | ESTER | PCL-700 | 61 | 40 | 56.0 | — | — | — | — | — |
| 75 | ESTER | PCL-700 | 61 | 40 | 56.0 | — | — | — | — | — |
| 76 | HDPE | MARLEX 6003 | 135 | 70–90 | 60.8 | — | — | — | — | — |
| 77 | HDPE | MARLEX 6003 | 135 | 70–90 | 61.4 | — | — | — | — | — |
| 78 | HDPE | MARLEX 6003 | 135 | 70–90 | 24.0 | EAA | EAA449 | 106 | 10–30 | 30.0 |
| 79 | HDPE | MARLEX 6003 | 135 | 70–90 | 61.4 | — | — | — | — | — |
| 80 | HDPE | MARLEX 6003 | 135 | 70–90 | 75.0 | — | — | — | — | — |
| 81 | HDPE | MARLEX 6003 | 135 | 70–90 | 74.3 | — | — | — | — | — |
| 82 | HDPE | MARLEX 6003 | 135 | 70–90 | 60.2 | — | — | — | — | — |
| 83 | HDPE | MARLEX 6003 | 135 | 70–90 | 59.0 | — | — | — | — | — |
| 84 | HDPE | ALATHON 7030 | 135 | 70–90 | 60.0 | — | — | — | — | — |
| 85 | HDPE | ALATHON 7030 | 135 | 70–90 | 60.0 | — | — | — | — | — |
| 86 | HDPE | ALATHON 7030 | 135 | 70–90 | 60.0 | — | — | — | — | — |
| 87 | HDPE | ALATHON 7030 | 135 | 70–90 | 60.0 | — | — | — | — | — |
| 88 | HDPE | ALATHON 7030 | 135 | 70–90 | 70.0 | — | — | — | — | — |
| 89 | HDPE | ALATHON 7030 | 135 | 70–90 | 70.0 | — | — | — | — | — |
| 90 | HDPE | ALATHON 7040 | 135 | 70–90 | 50.0 | — | — | — | — | — |
| 91 | HDPE | ALATHON 7040 | 135 | 70–90 | 50.0 | — | — | — | — | — |
| 92 | HDPE | ALATHON 7030 | 135 | 70–90 | 46.0 | — | — | — | — | — |
| 92 | HDPE | ALATHON 7030 | 135 | 70–90 | 46.0 | — | — | — | — | — |
| 94 | HDPE | ALATHON 7030 | 135 | 70–90 | 62.2 | — | — | — | — | — |
| 95 | HDPE | ALATHON 7030 | 135 | 70–90 | 62.2 | — | — | — | — | — |

| | | CARBON BLACK | | | | VOL. RATIO FILLER POLYMER |
|---|---|---|---|---|---|---|
| EX. NO. | NAME | D | S | S/D | AMT Wt % | |
| 1A | UNITED SL-90 | 90 | 24 | 0.27 | 53.0 | .43 |
| 1B | UNITED SL-90 | 90 | 24 | 0.27 | 53.0 | .43 |
| 2 | MOGUL | 24 | 138 | 5.75 | 30.0 | .23 |

TABLE I-continued
INGREDIENTS AND PROCESS CONDITIONS UTILIZED TO FABRICATE PTC COMPOSITIONS

| | | | | | | |
|---|---|---|---|---|---|---|
| 3 | MOGUL L | 24 | 138 | 5.75 | 30.0 | .23 |
| 4 | STERLING R | 75 | 25 | 0.34 | 44.6 | .44 |
| 5 | STERLING R | 75 | 25 | 0.34 | 44.6 | .44 |
| 6 | REGAL 300 | 25 | 94 | 3.76 | 34.7 | .29 |
| 7 | REGAL 300 | 25 | 94 | 3.76 | 34.7 | .29 |
| 8 | STATEX 550 | 47 | 40 | 0.86 | 39.6 | .36 |
| 9 | STATEX M550 | 47 | 40 | 0.86 | 39.6 | .36 |
| 10 | CONTINEX HAF | 28 | 86 | 3.07 | 34.7 | .29 |
| 11 | STERLING SO | 41 | 42 | 1.02 | 34.0 | .28 |
| 12 | STERLING SO | 41 | 42 | 1.02 | 37.3 | .33 |
| 13 | STERLING SO | 41 | 42 | 1.02 | 36.5 | .33 |
| 14 | UNITED SL-90 | 90 | 24 | 0.27 | 54.0 | .63 |
| 15 | UNITED SL-90 | 90 | 24 | 0.27 | 54.0 | .63 |
| 16 | FURNEX 765 | 60 | 30 | 0.50 | 44.0 | .43 |
| 17 | HAWINIGAN | 42 | 64 | 1.5 | 34.7 | .29 |
| 18 | SHAW | 42 | 64 | 1.5 | 34.7 | .29 |
| 19 | STATEX 160 | 19 | 146 | 7.68 | 37.6 | .33 |
| 20 | STATEX 160 | 19 | 146 | 7.68 | 37.6 | .33 |
| 21 | CONDUCTEX SC | 17 | 200 | 11.7 | 31.7 | .25 |
| 22 | CONDUCTEX SC | 17 | 200 | 11.7 | 31.7 | .25 |
| 23 | STATEX G | 68 | 32 | 0.47 | 40.0 | .37 |
| 24 | STATEX G | 68 | 32 | 0.47 | 40.0 | .37 |
| 25 | STATEX G | 68 | 32 | 0.47 | 40.0 | .37 |
| 26 | STATEX G | 68 | 32 | 0.47 | 40.0 | .37 |
| 27 | STERLING SO | 41 | 42 | 1.02 | 33.7 | .28 |
| 28 | STERLING SO | 41 | 42 | 1.02 | 33.7 | .28 |
| 29 | STERLING V | 50 | 36 | 0.72 | 41.0 | .38 |
| 30 | STERLING V | 50 | 36 | 0.72 | 41.0 | .38 |
| 31 | CONTINEX 785 | 60 | 31 | 0.52 | 35.0 | .29 |
| 32 | CONTINEX 785 | 60 | 31 | 0.52 | 35.0 | .29 |
| 33 | UNITED 650 | 66 | 36 | 0.55 | 36.0 | .31 |
| 34 | UNITED 650 | 66 | 36 | 0.55 | 36.0 | .31 |
| 35 | UNITED 660 | 68 | 36 | 0.53 | 41.0 | .38 |
| 36 | UNITED 660 | 68 | 36 | 0.53 | 41.0 | .38 |
| 37 | STATEX MT | 250 | 10 | 0.04 | 75 | 1.67 |
| 38 | STATEX MT | 250 | 10 | 0.04 | 75 | 1.67 |
| 39 | FURNEX 765 | 60 | 30 | 0.5 | 45.5 | .46 |
| 40 | FURNEX 765 | 60 | 30 | 0.5 | 45.5 | .46 |
| 41 | FURNEX 765 | 60 | 30 | 0.5 | 39.2 | .36 |
| 42 | FURNEX 765 | 60 | 30 | 0.5 | 40.0 | .36 |
| 43 | MONARCH 1300 | 13 | 560 | 43 | 35.0 | .29 |

TABLE I-continued
INGREDIENTS AND PROCESS CONDITIONS UTILIZED TO FABRICATE PTC COMPOSITIONS

| | | | | | | |
|---|---|---|---|---|---|---|
| 44 | MONARCH 1300 | 13 | 560 | 43 | 35.0 | .29 |
| 45 | MONARCH 1300 | 13 | 560 | 43 | 34.0 | .29 |
| 46 | MONARCH 1300 | 13 | 560 | 43 | 34.0 | .29 |
| 47 | KETJEN EC | 30 | 1000 | 33.3 | 15.0 | .09 |
| 48 | KETJEN EC | 30 | 1000 | 33.5 | 15.0 | .09 |
| 49 | KETJEN EC | 30 | 1000 | 33.3 | 14.6 | .09 |
| 50 | KETJEN EC | 30 | 1000 | 33.3 | 14.6 | .09 |
| 51 | FURNEX 765 | 60 | 30 | 0.5 | 40.0 | .35 |
| 52 | FURNEX 765 | 60 | 30 | 0.5 | 40.0 | .35 |
| 53 | FURNEX 765 | 60 | 30 | 0.50 | 47.0 | .48 |
| 54 | FURNEX 765 | 60 | 30 | 0.50 | 47.0 | .48 |
| 55 | FURNEX 765 | 60 | 30 | 0.50 | 44.0 | .43 |
| 56 | FURNEX 765 | 60 | 30 | 0.50 | 44.0 | .43 |
| 57 | STERLING SO | 41 | 42 | 1.02 | 34.3 | .28 |
| 58 | STERLING SO | 41 | 42 | 1.02 | 37.3 | .28 |
| 59 | STERLING SO | 41 | 42 | 1.02 | 37.3 | .28 |
| 60 | UNITED SL-90 | 90 | 24 | 0.27 | 34.7 | .38 |
| 61 | UNITED SL-90 | 90 | 24 | 0.27 | 34.7 | .38 |
| 62 | FURNEX 765 | 60 | 30 | 0.50 | 46.0 | .46 |
| 63 | FURNEX 765 | 60 | 30 | 0.50 | 46.0 | .46 |
| 64 | FURNEX 765 | 60 | 30 | 0.50 | 51.0 | .58 |
| 65 | FURNEX 765 | 60 | 30 | 0.50 | 51.0 | .58 |
| 66 | FURNEX 765 | 60 | 30 | 0.50 | 44.0 | .44 |
| 67 | FURNEX 765 | 60 | 30 | 0.50 | 44.0 | .44 |
| 68 | FURNEX 765 | 60 | 30 | 0.50 | 47.0 | .46 |
| 69 | FURNEX 765 | 60 | 30 | 0.50 | 47.0 | .46 |
| 70 | FURNEX 765 | 60 | 30 | 0.50 | 47.0 | .45 |
| 71 | FURNEX 765 | 60 | 30 | 0.50 | 4.70 | .45 |
| 72 | FURNEX 765 | 60 | 30 | 0.50 | 20.0 | .59 |
| 73 | FURNEX 765 | 60 | 30 | 0.50 | 20.0 | .59 |
| 74 | FURNEX 765 | 60 | 30 | 0.50 | 42.0 | .46 |
| 75 | FURNEX 765 | 60 | 30 | 0.50 | 42.0 | .46 |
| 76 | STERLING SO | 41 | 42 | 1.02 | 37.3 | .33 |
| 77 | STERLING SO | 41 | 42 | 1.02 | 37.6 | .33 |
| 78 | FURNEX 765 | 60 | 30 | 0.50 | 44.0 | .43 |
| 79 | STERLING SO | 41 | 42 | 1.02 | 37.6 | .33 |
| 80 | XC-72 | 30 | 254 | 8.4 | 25.0 | .18 |
| 81 | XC-72 | 30 | 254 | 8.4 | 24.8 | .18 |
| 82 | STERLING SO | 41 | 42 | 1.02 | 36.9 | .33 |
| 83 | STERLING SO | 41 | 42 | 1.02 | 36.0 | .33 |
| 84 | STERLING V | 50 | 36 | 0.69 | 40.0 | .36 |
| 85 | STERLING | 50 | 36 | 0.69 | 40.0 | .36 |

TABLE I-continued
INGREDIENTS AND PROCESS CONDITIONS UTILIZED TO FABRICATE PTC COMPOSITIONS

| | V | | | | | |
|---|---|---|---|---|---|---|
| 86 | VULCAN 3 | 28 | 80 | 2.86 | 40.0 | .36 |
| 87 | VULCAN 3 | 28 | 80 | 2.86 | 40.0 | .36 |
| 88 | VULCAN XC-72 | 30 | 254 | 8.4 | 30.0 | .23 |
| 89 | VULCAN XC-72 | 30 | 254 | 8.4 | 30.0 | .23 |
| 90 | UNITED SL-90 | 90 | 24 | 0.27 | 50.0 | .53 |
| 91 | UNITED SL-90 | 90 | 24 | 0.27 | 50.0 | .53 |
| 92 | UNITED SL-90 | 90 | 24 | 0.27 | 54.0 | .63 |
| 93 | UNITED SL-90 | 90 | 24 | 0.27 | 54.0 | .63 |
| 94 | VULCAN 3 | 28 | 80 | 2.86 | 19.5 | .17 |
| 95 | VULCAN 3 | 28 | 80 | 2.86 | 19.5 | .17 |

| | ADDITIVE | | | | PROCESS CONDITIONS | | | | |
|---|---|---|---|---|---|---|---|---|---|
| EX. NO. | TYPE | NAME | AMT. WT. % | FAB FAB TECH | PROC TEMP °C. | PROC TIME Min | SHEAR HISTORY HrHPft$^{-3}$ | RAD DOSE Mr | CHEM XL T, t |
| 1A | AO | | 1.0 | MILL | 190 | 5 | 6 | 0 | — |
| 1B | A0 | | 1.0 | MILL | 190 | 5 | 6 | 20 | — |
| 2 | — | — | — | MILL | 190 | 5 | 6 | 0 | — |
| 3 | — | — | — | MILL | 190 | 5 | 6 | 20 | — |
| 4 | AO | | 0.9 | MILL | 190 | 5 | 6 | 0 | — |
| 5 | AO | | 0.9 | MILL | 190 | 5 | 6 | 20 | — |
| 6 | AO | | 0.9 | MILL | 190 | 5 | 6 | 0 | — |
| 7 | AO | | 0.9 | MILL | 190 | 5 | 6 | 20 | — |
| 8 | AO | | 1.0 | MILL | 190 | 5 | 6 | 0 | — |
| 9 | AO | | 1.0 | MILL | 190 | 5 | 6 | 20 | — |
| 10 | AO | | 0.9 | MILL | 190 | 5 | 6 | 0 | — |
| 11 | — | — | — | MILL | 190 | 5 | 6 | 20 | — |
| 12 | AO | | 1.9 | MILL | 190 | 5 | 6 | 20 | — |
| 13 | AO CXA | ARD 130XL | 1.9 1.9 | MILL | 190 | 5 | 6 | 0 | 200°,12 |
| 14 | — | — | — | MILL | 190 | 5 | 6 | 0 | — |
| 15 | — | — | — | MILL | 190 | 5 | 6 | 20 | — |
| 16 | AO | | 2.0 | MILL | 190 | 5 | 6 | 20 | — |
| 17 | A0 | | 1.0 | MILL | 190 | 5 | 6 | 0 | — |
| 18 | AO | | 1.0 | MILL | 190 | 5 | 6 | 20 | — |
| 19 | AO | | 1.0 | MILL | 190 | 5 | 6 | 0 | — |
| 20 | AO | | 1.0 | MILL | 190 | 5 | 6 | 20 | — |
| 21 | AO | | 1.0 | MILL | 190 | 5 | 6 | 0 | — |
| 22 | AO | | 1.0 | MILL | 190 | 5 | 6 | 20 | — |
| 23 | AO | | 1.8 | BRA | 225 | 6 at 120 rpm | 44.3 | 0 | — |
| 24 | A0 | | 1.8 | BRA | 225 | 6 at 120 rpm | 44.3 | 20 | — |
| 25 | AO | | 1.8 | BRA | 225 | 4 at 60 rpm | 15.1 | 0 | — |
| 26 | AO | | 1.8 | BRA | 225 | 4 at 60 rpm | 15.1 | 20 | — |
| 27 | AO | | 1.0 | MILL | 190 | 5 | 6 | 0 | — |
| 28 | AO | | 1.0 | MILL | 190 | 5 | 6 | 20 | — |
| 29 | AO | | 1.0 | MILL | 190 | 5 | 6 | 0 | — |
| 30 | AO | | 1.0 | MILL | 190 | 5 | 6 | 20 | — |
| 31 | AO | | 1.0 | MILL | 190 | 5 | 6 | 0 | — |
| 32 | AO | | 1.0 | MILL | 190 | 5 | 6 | 20 | — |
| 33 | AO | | 1.0 | MILL | 190 | 5 | 6 | 0 | — |
| 34 | AO | | 1.0 | MILL | 190 | 5 | 6 | 20 | — |
| 35 | AO | | 1.0 | MILL | 190 | 5 | 6 | 0 | — |
| 36 | AO | | 1.0 | MILL | 190 | 5 | 6 | 2 | — |
| 37 | AO | | 1.0 | MILL | 190 | 5 | 6 | 0 | — |
| 38 | AO | | 1.0 | MILL | 190 | 5 | 6 | 20 | — |
| 39 | AO | | 2.0 | BAN | 180 | 3 | 15.8 | 0 | — |
| 40 | AO | | 2.0 | BAN | 180 | 3 | 15.8 | 20 | — |
| 41 | AO | | 2.0 | MILL | 190 | 5 | 6 | 20 | — |
| 42 | — | — | — | MILL | 190 | 5 | 6 | 20 | — |
| 43 | — | — | — | MILL | 190 | 5 | 6 | 0 | — |
| 44 | — | — | — | MILL | 190 | 5 | 6 | 20 | — |
| 45 | AO | | 3.0 | MILL | 190 | 5 | 6 | 0 | — |

TABLE I-continued
INGREDIENTS AND PROCESS CONDITIONS UTILIZED TO FABRICATE PTC COMPOSITIONS

| | | | | | | | | | |
|---|---|---|---|---|---|---|---|---|---|
| 46 | AO | | 3.0 | MILL | 190 | 5 | 6 | 20 | — |
| 47 | — | — | — | MILL | 190 | 5 | 6 | 0 | — |
| 48 | — | — | — | MILL | 190 | 5 | 6 | 20 | — |
| 49 | AO | | 2.9 | MILL | 190 | 5 | 6 | 0 | — |
| 50 | AO | | 2.9 | MILL | 190 | 5 | 6 | 20 | — |
| 51 | AO | | 2.0 | BAN | 200 | 3 | .3 | 0 | — |
| 52 | AO | | 2.0 | BAN | 200 | 3 | .3 | 20 | — |
| 53 | AO | | 2.0 | BAN | 180 | 3 | 12 | 0 | — |
| 54 | AO | | 2.0 | BAN | 180 | 3 | 12 | 20 | — |
| 55 | AO | | 2.0 | BAN | 180 | 3 | 12 | 0 | — |
| 56 | AO | | 2.0 | BAN | 180 | 3 | 12 | 20 | — |
| 57 | AO | | 1.9 | MILL | 190 | 5 | 6 | 20 | — |
| 58 | AO | | 1.9 | MILL | 190 | 5 | 6 | 0 | — |
| 59 | AO | | 1.9 | MILL | 190 | 5 | 6 | 20 | — |
| 60 | — | — | — | MILL | 190 | 5 | 6 | 0 | — |
| 61 | — | — | — | MILL | 190 | 5 | 6 | 20 | — |
| 62 | AO | | 2.0 | BAN | 180 | 3 | 10 | 0 | — |
| 63 | AO | | 2.0 | BAN | 180 | 3 | 10 | 20 | — |
| 64 | AO | | 2.0 | BAN | 160 | 3 | 9 | 0 | — |
| 65 | AO | | 2.0 | BAN | 160 | 3 | 9 | 20 | — |
| 66 | AO | | 2.0 | MILL | 190 | 5 | 6 | 0 | — |
| 67 | AO | | 2.0 | MILL | 190 | 5 | 6 | 20 | — |
| 68 | AO | | 1.0 | MILL | 135 | 3 | 4 | 0 | — |
| 69 | AO | | 1.0 | MILL | 135 | 3 | 4 | 20 | — |
| 70 | AO | | 1.0 | MILL | 185 | 3 | 4 | 0 | — |
| 71 | AO | | 1.0 | MILL | 185 | 3 | 4 | 20 | — |
| 72 | Acid | $CaCO_3$ | 2.0 | BRA | 220 | 3 | 8 | 0 | — |
| 73 | Acid | $CaCO_3$ | 2.0 | BRA | 220 | 3 | 8 | 20 | — |
| 74 | AO | | 2.0 | BAN | 100 | 3 | 8 | 0 | — |
| 75 | AO | | 2.0 | BAN | 100 | 3 | 8 | 20 | — |
| 76 | CXA | 130XL | 1.9 | MILL | 190 | 5 | 6 | 0 | 200,12 |
| 77 | AO | | 1.0 | MILL | 190 | 5 | 6 | 20 | — |
| 78 | AO | | 2.0 | ZSK | 190 | 3 | 43 | 20 | — |
| 79 | AO | | 1.0 | MILL | 190 | 5 | 6 | 0 | — |
| 80 | — | — | — | MILL | 190 | 5 | 6 | 20 | — |
| 81 | AO | | 0.9 | MILL | 190 | 5 | 6 | 20 | — |
| 82 | XLA | TAIC | 2.9 | MILL | 190 | 5 | 6 | 20 | — |
| 83 | XLA | TAIC | 2.9 | MILL | 190 | 5 | 6 | 20 | — |
| | AO | | 1.9 | | | | | | |
| 84 | — | — | — | MILL | 190 | 5 | 6 | 0 | — |
| 85 | — | — | — | MILL | 190 | 5 | 6 | 20 | — |
| 86 | — | — | — | MILL | 190 | 5 | 6 | 0 | — |
| 87 | — | — | — | MILL | 190 | 5 | 6 | 20 | — |
| 88 | — | — | — | MILL | 190 | 5 | 6 | 0 | — |
| 89 | — | — | — | MILL | 190 | 5 | 6 | 20 | — |
| 90 | — | — | — | MILL | 190 | 5 | 6 | 0 | — |
| 91 | — | — | — | MILL | 190 | 5 | 6 | 20 | — |
| 92 | — | — | — | MILL | 190 | 5 | 6 | 0 | — |
| 93 | — | — | — | MILL | 190 | 5 | 6 | 20 | — |
| 94 | AO SANTOVARA | | 7.8 | MILL | 190 | 5 | 6 | 0 | |
| | FR DECHLORANE | | 7.0 | | | | | | |
| | FR $Sb_2O_3$ | | 3.5 | | | | | | |
| 95 | AO SANTOVARA | | 7.8 | MILL | 190 | 5 | 6 | 20 | — |
| | FR DECHLORANE | | 7.0 | | | | | | |
| | FR $Sb_2O_3$ | | 3.5 | | | | | | |

TABLE II
ELECTRICAL BEHAVIOR OF PTC COMPOSITIONS AFTER FABRICATION

| Example No. | $\left(\frac{S}{D}\right)$ | $\left(\frac{Vol\ filler}{polymer}\right)$ | $\rho\ 20$ | $\rho p$ | $T_{2x}$ | $T_5$ | $T_{\rho p}$ |
|---|---|---|---|---|---|---|---|
| 1A | 0.12 | $6.5 \times 10^{-1}$ | $4.2 \times 10^4$ | 125 | 139 | 144 | |
| 1B | 0.12 | $1.3 \times 10^0$ | $>1.7 \times 10^6$ | 120 | 132 | >145 | |
| 2 | 1.32 | $3.6 \times 10^0$ | $5.1 \times 10^2$ | 105 | 127 | 137 | |
| 3 | 1.32 | $5.9 \times 10^0$ | $5.3 \times 10^5$ | 87 | 124 | 137 | |
| 4 | 0.15 | $8.0 \times 10^{-1}$ | $2.4 \times 10^3$ | 113 | 130 | 142 | |
| 5 | 0.15 | $9.0 \times 10^{-1}$ | $2.2 \times 10^5$ | 97 | 130 | 138 | |
| 6 | 1.08 | $5.8 \times 10^0$ | $>2.0 \times 10^6$ | 110 | 130 | >137 | |
| 7 | 1.08 | $5.1 \times 10^0$ | $>1.5 \times 10^6$ | 100 | 125 | >137 | |
| 8 | 0.31 | $9.0 \times 10^{-1}$ | $1.7 \times 10^6$ | 97 | 23 | >150 | |
| 9 | 0.31 | $1.1 \times 10^0$ | $2.1 \times 10^3$ | 123 | 136 | 145 | |
| 10 | 0.88 | $1.9 \times 10^0$ | $1.1 \times 10^6$ | 118 | 131 | >160 | |
| 11 | 0.28 | $5.9 \times 10^0$ | $>1.4 \times 10^6$ | 105 | 125 | >130 | |
| 12 | 0.33 | $5.6 \times 10^0$ | $>1.6 \times 10^6$ | 110 | 131 | >140 | |
| 13 | 0.33 | $1.2 \times 10^1$ | $9.4 \times 10^5$ | 110 | 130 | >160 | |
| 14 | 0.17 | $4.5 \times 10^{-1}$ | $8.9 \times 10^2$ | 130 | 134 | 140 | |

TABLE II-continued
ELECTRICAL BEHAVIOR OF PTC COMPOSITIONS AFTER FABRICATION

| Example No. | $\left(\dfrac{S}{D}\right)$ | $\left(\dfrac{\text{Vol filler}}{\text{polymer}}\right)$ | $\rho 20$ | $\rho p$ | $T_{2x}$ | $T_5$ | $T_{\rho p}$ |
|---|---|---|---|---|---|---|---|
| 15 | 0.17 | $6.9 \times 10^{-1}$ | $1.7 \times 10^4$ | 123 | 126 | >160 |
| 16 | 0.33 | $2.9 \times 10^0$ | $9.5 \times 10^5$ | 81 | 85 | >175 |
| 17 | 0.43 | $2.2 \times 10^0$ | $1.3 \times 10^3$ | 126 | 130 | 140 |
| 18 | 0.43 | $3.4 \times 10^0$ | $2.6 \times 10^2$ | 118 | 126 | >175 |
| 19 | 0.43 | $1.6 \times 10^0$ | $1.3 \times 10^2$ | 117 | 130 | 140 |
| 20 | 2.51 | $2.7 \times 10^0$ | $7.4 \times 10^2$ | 118 | 125 | >175 |
| 21 | 2.51 | $2.9 \times 10^0$ | $2.6 \times 10^2$ | 113 | 130 | 140 |
| 22 | 2.34 | $5.9 \times 10^0$ | $1.9 \times 10^4$ | 110 | 127 | >175 |
| 23 | 0.17 | $4.4 \times 10^0$ | $>1.8 \times 10^6$ | 115 | 132 | >140 |
| 24 | 0.17 | $8.4 \times 10^0$ | $>1.5 \times 10^6$ | 95 | 127 | >135 |
| 25 | 0.17 | $7.1 \times 10^0$ | $>1.4 \times 10^6$ | 111 | 131 | >139 |
| 26 | 0.17 | $9.4 \times 10^0$ | $>1.6 \times 10^6$ | 85 | 125 | >135 |
| 27 | 0.28 | $1.5 \times 10^0$ | $1.3 \times 10^5$ | 115 | 131 | 140 |
| 28 | 0.28 | $3.1 \times 10^0$ | $1.5 \times 10^5$ | 108 | 129 | 140 |
| 29 | .27 | $1.1 \times 10^0$ | $8.5 \times 10^4$ | 112 | 133 | 145 |
| 30 | .27 | $3.5 \times 10^0$ | $>1.4 \times 10^6$ | 100 | 127 | 137 |
| 31 | .15 | $4.6 \times 10^0$ | $>1.8 \times 10^6$ | 94 | 134 | >145 |
| 32 | .15 | $1.4 \times 10^1$ | $>1.8 \times 10^6$ | 100 | 126 | >139 |
| 33 | .17 | $2.4 \times 10^0$ | $>1.9 \times 10^6$ | 118 | 138 | >146 |
| 34 | .17 | $7.9 \times 10^0$ | $>1.9 \times 10^6$ | 112 | 130 | >138 |
| 35 | .20 | $1.6 \times 10^0$ | $2.1 \times 10^4$ | 120 | 138 | 150 |
| 36 | .20 | $4.0 \times 10^0$ | $1.9 \times 10^5$ | 115 | 131 | >175 |
| 37 | .07 | $5.8 \times 10^0$ | $1.7 \times 10^5$ | 128 | 136 | >175 |
| 38 | .07 | $8.2 \times 10^0$ | $1.2 \times 10^5$ | 131 | 134 | >175 |
| 39 | .23 | $1.5 \times 10^1$ | $2.6 \times 10^3$ | 87 | 125 | 138 |
| 40 | .23 | $5.7 \times 10^1$ | $1.9 \times 10^5$ | 90 | 124 | 138 |
| 41 | .18 | $5.1 \times 10^0$ | $>1.6 \times 10^6$ | 112 | 130 | >138 |
| 42 | .18 | $3.8 \times 10^0$ | $>1.5 \times 10^6$ | 117 | 128 | >140 |
| 43 | 12.34 | $9.1 \times 10^0$ | $6.4 \times 10^1$ | 122 | 117 | 140 |
| 44 | 12.34 | $2.2 \times 10^1$ | $1.9 \times 10^2$ | 118 | 120 | 135 |
| 45 | 12.34 | $1.6 \times 10^1$ | $1.8 \times 10^2$ | 124 | 124 | 140 |
| 46 | 12.34 | $2.5 \times 10^1$ | $3.8 \times 10^2$ | 125 | 123 | 140 |
| 47 | 3.13 | $1.7 \times 10^0$ | $4.3 \times 10^0$ | 139 | 127 | 142 |
| 48 | 3.13 | $2.5 \times 10^0$ | $6.0 \times 10^0$ | 137 | 122 | >175 |
| 49 | 3.13 | $2.4 \times 10^0$ | $6.5 \times 10^0$ | 138 | 130 | 143 |
| 50 | 3.13 | $2.7 \times 10^0$ | $8.2 \times 10^0$ | 135 | 125 | 139 |
| 51 | .18 | $4.6 \times 10^0$ | $>2.0 \times 10^6$ | 109 | 128 | >136 |
| 52 | .18 | $1.5 \times 10^1$ | $>1.8 \times 10^6$ | 95 | 126 | >137 |
| 53 | .24 | $1.9 \times 10^0$ | $5.8 \times 10^3$ | 75 | 87 | 121 |
| 54 | .24 | $5.0 \times 10^0$ | $>1.7 \times 10^6$ | 78 | 99 | >175 |
| 55 | .22 | $2.2 \times 10^0$ | $3.4 \times 10^3$ | 65 | 85 | 115 |
| 56 | .22 | $3.6 \times 10^0$ | $2.2 \times 10^4$ | 67 | 83 | >175 |
| 57 | .28 | $4.3 \times 10^0$ | $>1.4 \times 10^6$ | 104 | 129 | >140 |
| 58 | .28 | $2.3 \times 10^0$ | $3.6 \times 10^2$ | 101 | 120 | 140 |
| 59 | .28 | $3.6 \times 10^0$ | $7.7 \times 10^2$ | 103 | 125 | >175 |
| 60 | .10 | $1.3 \times 10^0$ | $2.2 \times 10^4$ | 117 | 138 | 145 |
| 61 | .10 | $1.9 \times 10^0$ | $>2.2 \times 10^6$ | 117 | 129 | >175 |
| 62 | .23 | $1.7 \times 10^0$ | $1.7 \times 10^4$ | 100 | 114 | 130 |
| 63 | .23 | $2.6 \times 10^0$ | $4.3 \times 10^5$ | 100 | 114 | >180 |
| 64 | .29 | $2.4 \times 10^0$ | $1.7 \times 10^4$ | 59 | 85 | 108 |
| 65 | .29 | $2.5 \times 10^0$ | $5.6 \times 10^3$ | 87 | 82 | >180 |
| 66 | .22 | $1.5 \times 10^0$ | $3.1 \times 10^4$ | 126 | 132 | 144 |
| 67 | .22 | $1.6 \times 10^0$ | $4.2 \times 10^4$ | 116 | 131 | 139 |
| 68 | .23 | $1.6 \times 10^0$ | $2.5 \times 10^3$ | 75 | 100 | 120 |
| 69 | .23 | $2.1 \times 10^0$ | $4.8 \times 10^4$ | 75 | 93 | >180 |
| 70 | .23 | $2.4 \times 10^0$ | $3.2 \times 10^3$ | 120 | 142 | 183 |
| 71 | .23 | $3.8 \times 10^0$ | $3.3 \times 10^3$ | 115 | 136 | 166 |
| 72 | .30 | $3.4 \times 10^0$ | $9.3 \times 10^3$ | 115 | 145 | 166 |
| 73 | .30 | $2.1 \times 10^1$ | $1.8 \times 10^6$ | 105 | 138 | >161 |
| 74 | .23 | $2.6 \times 10^0$ | $4.0 \times 10^3$ | 50 | 55 | 61 |
| 75 | .23 | $2.6 \times 10^0$ | $5.7 \times 10^3$ | 50 | 55 | 61 |
| 76 | .33 | $7.1 \times 10^0$ | $1.7 \times 10^5$ | 105 | 128 | >160 |
| 77 | .33 | $6.6 \times 10^0$ | $1.5 \times 10^6$ | 105 | 127 | >135 |
| 78 | .33 | $2.9 \times 10^0$ | $0.5 \times 10^5$ | 81 | 85 | >175 |
| 79 | .33 | $5.8 \times 10^0$ | $1.7 \times 10^6$ | 120 | 129 | 140 |
| 80 | 1.50 | $9.1 \times 10^0$ | $3.6 \times 10^3$ | 110 | 129 | >160 |
| 81 | 1.50 | $1.5 \times 10^1$ | $3.6 \times 10^4$ | 110 | 130 | >160 |
| 82 | .33 | $7.1 \times 10^0$ | $>1.8 \times 10^6$ | 108 | 125 | >135 |
| 83 | .33 | $7.1 \times 10^0$ | $>1.7 \times 10^6$ | 110 | 125 | >137 |
| 84 | .25 | $8.6 \times 10^{-1}$ | $8.6 \times 10^2$ | 112 | 132 | 140 |
| 85 | .25 | $1.4 \times 10^0$ | $4.3 \times 10^3$ | 110 | 125 | >160 |
| 86 | 1.02 | $7.4 \times 10^{-1}$ | $6.9 \times 10^1$ | 120 | 130 | 140 |
| 87 | 1.02 | $9.4 \times 10^{-1}$ | $5.2 \times 10^2$ | 105 | 125 | 140 |
| 88 | 1.92 | $1.9 \times 10^0$ | $1.9 \times 10^1$ | 125 | 127 | 140 |
| 89 | 1.92 | $2.0 \times 10^{-1}$ | $2.2 \times 10^5$ | 125 | 125 | >160 |

TABLE II-continued
ELECTRICAL BEHAVIOR OF PTC COMPOSITIONS AFTER FABRICATION

| Example No. | $\left(\frac{S}{D}\right)$ | $\left(\frac{\text{Vol filler}}{\text{polymer}}\right)$ | $\rho\, 20$ | $\rho p$ | $T_{2x}$ | $T_5$ | $T_{\rho p}$ |
|---|---|---|---|---|---|---|---|
| 90 | .14 | $6.0 \times 10^{-1}$ | | $1.5 \times 10^3$ | 122 | 131 | 140 |
| 91 | .14 | $1.4 \times 10^0$ | | $>1.5 \times 10^6$ | 110 | 127 | >155 |
| 92 | .17 | $4.5 \times 10^{-1}$ | | $8.9 \times 10^2$ | 130 | 134 | 140 |
| 93 | .17 | $6.9 \times 10^{-1}$ | | $1.7 \times 10^4$ | 123 | 126 | >160 |
| 94 | .49 | $3.0 \times 10^1$ | | $1.0 \times 10^5$ | 90 | 125 | 140 |
| 95 | .49 | $4.4 \times 10^2$ | | $1.6 \times 10^6$ | 80 | 116 | >135 |

TABLE III

ELECTRICAL BEHAVIOR OF PTC COMPOSITIONS AFTER EXPOSURE TO A THERMAL ENVIRONMENT

| EXAMPLES | EXPOSURE CONDITIONS | | ORIGINAL PERFORMANCE | | 2h | | 9h | | 27h | | 46h | | 52h | | 73h | | FINAL PERFORMANCE | |
|---|---|---|---|---|---|---|---|---|---|---|---|---|---|---|---|---|---|---|
| | $\rho_T$ | T | $\rho_{20}$ | $\rho_p$ | $\rho$ | Change | $\rho$ | Change | $\rho$ | change | $\rho$ | change | $\rho$ | change | $\rho$ | change | $\rho_{20}$ | $\rho_p$ |
| 1A | $2.0 \times 10^4$ | 140 | $8.3 \times 10^{-1}$ | $4.2 \times 10^4$ | $3.4 \times 10^{-1}$ | 1% | $1.1 \times 10^0$ | 1% | $1.2 \times 10^0$ | 44% | $1.8 \times 10^0$ | 116% | | | $5.8 \times 10^0$ | 598% | $5.8 \times 10^0$ | $1.7 \times 10^6$ |
| 2 | $5.2 \times 10^2$ | 130 | $1.6 \times 10^1$ | $5.1 \times 10^2$ | $1.6 \times 10^1$ | 0% | $1.5 \times 10^1$ | 6% | $1.4 \times 10^1$ | 12% | | | $1.4 \times 10^1$ | 12% | | | $1.4 \times 10^1$ | $1.0 \times 10^2$ |
| 3 | $1.6 \times 10^4$ | 130 | $5.9 \times 10^0$ | $5.3 \times 10^5$ | $5.6 \times 10^0$ | 5% | $6.6 \times 10^0$ | 12% | $9.9 \times 10^0$ | 68% | | | $1.4 \times 10^1$ | 137% | | | $1.4 \times 10^1$ | $>1.1 \times 10^6$ |
| 4 | $6.5 \times 10^2$ | 130 | $4.0 \times 10^0$ | $2.4 \times 10^3$ | $4.0 \times 10^0$ | 0% | $3.8 \times 10^0$ | 0% | $3.6 \times 10^0$ | 10% | | | $3.2 \times 10^0$ | 20% | | | $3.2 \times 10^0$ | $2.1 \times 10^1$ |
| 5 | $1.4 \times 10^6$ | 130 | $1.3 \times 10^0$ | $2.2 \times 10^5$ | $1.5 \times 10^0$ | 15% | $1.7 \times 10^0$ | 30% | $2.2 \times 10^0$ | 69% | | | $2.7 \times 10^0$ | 107% | | | $2.0 \times 10^0$ | $2.2 \times 10^5$ |
| 7 | $1.8 \times 10^5$ | 130 | $7.5 \times 10^0$ | $>1.5 \times 10^6$ | $7.6 \times 10^0$ | 1% | $9.1 \times 10^0$ | 21% | $1.1 \times 10^1$ | 47% | | | $1.3 \times 10^0$ | 73% | | | $1.3 \times 10^0$ | $5.0 \times 10^5$ |
| 8 | $8.3 \times 10^2$ | 130 | $4.5 \times 10^0$ | $1.7 \times 10^6$ | $4.5 \times 10^0$ | 0% | $4.0 \times 10^0$ | 11% | $3.8 \times 10^0$ | 16% | | | $3.4 \times 10^0$ | 24% | | | $3.4 \times 10^0$ | $1.6 \times 10^5$ |
| 9 | $2.1 \times 10^6$ | 130 | $7.3 \times 10^0$ | $2.1 \times 10^3$ | $8.5 \times 10^0$ | 16% | $9.4 \times 10^0$ | 29% | $1.1 \times 10^1$ | 51% | | | $1.4 \times 10^1$ | 92% | | | $1.4 \times 10^1$ | $6.0 \times 10^5$ |
| 10 | $1.1 \times 10^2$ | 130 | $2.8 \times 10^0$ | $1.1 \times 10^6$ | $3.0 \times 10^0$ | 7% | $2.9 \times 10^0$ | 4% | $2.8 \times 10^0$ | 3% | | | $2.7 \times 10^0$ | 2% | | | $2.7 \times 10^0$ | $1.1 \times 10^5$ |
| 11 | $1.4 \times 10^6$ | 130 | $5.7 \times 10^0$ | $>1.4 \times 10^6$ | $6.7 \times 10^0$ | 18% | $7.1 \times 10^0$ | 24% | $8.5 \times 10^0$ | 49% | | | $9.9 \times 10^0$ | 74% | | | $9.9 \times 10^0$ | $3.2 \times 10^5$ |
| 12 | $1.6 \times 10^6$ | 130 | $4.5 \times 10^0$ | $>1.6 \times 10^6$ | $5.2 \times 10^0$ | 16% | $5.6 \times 10^0$ | 24% | $6.7 \times 10^0$ | 49% | | | $7.5 \times 10^0$ | 67% | | | $7.5 \times 10^0$ | $9.5 \times 10^5$ |
| 13 | $2.3 \times 10^5$ | 130 | $9.4 \times 10^0$ | $9.4 \times 10^5$ | $1.2 \times 10^1$ | 28% | $1.3 \times 10^1$ | 38% | $1.4 \times 10^1$ | 49% | | | $1.5 \times 10^1$ | 59% | | | $1.5 \times 10^1$ | $1.5 \times 10^4$ |
| 29 | $3.0 \times 10^4$ | 140 | $1.5 \times 10^0$ | $8.5 \times 10^4$ | $1.6 \times 10^0$ | 7% | $1.8 \times 10^0$ | 20% | $2.3 \times 10^0$ | 53% | $2.8 \times 10^0$ | 87% | | | $3.1 \times 10^0$ | 106% | $3.1 \times 10^0$ | $>1.6 \times 10^6$ |
| 33 | $>1.9 \times 10^6$ | 140 | $3.8 \times 10^0$ | $>1.9 \times 10^6$ | $4.2 \times 10^0$ | 11% | $9.4 \times 10^0$ | 147% | $6.0 \times 10^0$ | 58% | $7.4 \times 10^0$ | 95% | | | $8.5 \times 10^0$ | 123% | $8.5 \times 10^0$ | $>1.9 \times 10^6$ |
| 35 | $3.1 \times 10^3$ | 140 | $1.6 \times 10^0$ | $2.1 \times 10^4$ | $1.5 \times 10^0$ | 6% | $1.7 \times 10^0$ | 6% | $2.0 \times 10^0$ | 25% | $2.5 \times 10^0$ | 56% | | | $3.3 \times 10^0$ | 106% | $3.3 \times 10^0$ | $2.6 \times 10^3$ |
| 40 | $3.3 \times 10^4$ | 130 | $1.6 \times 10^0$ | $1.9 \times 10^5$ | $2.0 \times 10^0$ | 25% | $2.5 \times 10^0$ | 56% | $2.8 \times 10^0$ | 75% | | | $4.7 \times 10^0$ | 193% | | | $4.7 \times 10^0$ | $2.1 \times 10^3$ |
| 41 | $7.5 \times 10^4$ | 130 | $4.4 \times 10^0$ | $>1.6 \times 10^6$ | $4.9 \times 10^0$ | 11% | $5.3 \times 10^0$ | 20% | $6.1 \times 10^0$ | 39% | | | $6.4 \times 10^0$ | 45% | | | $6.4 \times 10^0$ | $1.5 \times 10^2$ |
| 42 | $7.0 \times 10^4$ | 130 | $3.3 \times 10^1$ | $>1.5 \times 10^6$ | $3.6 \times 10^0$ | 9% | $3.8 \times 10^0$ | 18% | $4.4 \times 10^0$ | 86% | | | $4.4 \times 10^0$ | 86% | | | $4.4 \times 10^0$ | $4.4 \times 10^1$ |
| 51 | $2.7 \times 10^2$ | 130 | $1.9 \times 10^0$ | $>2.0 \times 10^6$ | $2.0 \times 10^0$ | 5% | $2.0 \times 10^0$ | 5% | $2.1 \times 10^0$ | 10% | | | $2.0 \times 10^0$ | 5% | | | $3.0 \times 10^0$ | $3.0 \times 10^1$ |
| 52 | $3.2 \times 10^3$ | 130 | $7.1 \times 10^0$ | $>1.8 \times 10^6$ | $6.9 \times 10^0$ | 3% | $7.0 \times 10^0$ | 2% | $7.0 \times 10^0$ | 2% | | | $7.0 \times 10^0$ | 2% | | | $7.0 \times 10^0$ | $1.6 \times 10^3$ |
| 62 | $1.9 \times 10^4$ | 140 | $1.7 \times 10^0$ | $2.5 \times 10^4$ | $2.2 \times 10^0$ | 29% | $2.4 \times 10^0$ | 41% | $3.7 \times 10^0$ | 117% | $4.2 \times 10^0$ | 147% | | | $3.7 \times 10^0$ | 117% | $3.7 \times 10^0$ | $>1.0 \times 10^5$ |
| 63 | $3.3 \times 10^5$ | 140 | $2.6 \times 10^0$ | $4.3 \times 10^5$ | $3.1 \times 10^0$ | 19% | $3.7 \times 10^0$ | 42% | $5.0 \times 10^0$ | 92% | $5.6 \times 10^0$ | 115% | | | $4.6 \times 10^0$ | 77% | $4.6 \times 10^0$ | $>2.0 \times 10^6$ |
| 64 | $6.4 \times 10^3$ | 140 | $2.4 \times 10^0$ | $1.7 \times 10^4$ | $3.0 \times 10^0$ | 25% | $3.6 \times 10^0$ | 25% | $5.1 \times 10^0$ | 112% | $5.9 \times 10^0$ | 145% | | | $6.6 \times 10^0$ | 175% | $6.6 \times 10^0$ | $>3.3 \times 10^6$ |
| 65 | $5.9 \times 10^2$ | 140 | $2.5 \times 10^0$ | $1.9 \times 10^3$ | $3.3 \times 10^0$ | 32% | $3.9 \times 10^0$ | 56% | $5.1 \times 10^0$ | 104% | $5.2 \times 10^0$ | 108% | | | $4.6 \times 10^0$ | 84% | $4.6 \times 10^0$ | $>2.7 \times 10^3$ |
| 66 | $2.2 \times 10^4$ | 140 | $1.5 \times 10^0$ | $3.1 \times 10^4$ | $8.4 \times 10^0$ | 460% | $6.2 \times 10^0$ | 313% | $1.3 \times 10^1$ | 767% | $1.0 \times 10^1$ | 566% | | | $1.3 \times 10^1$ | 767% | $7.4 \times 10^1$ | $7.4 \times 10^4$ |
| 67 | $6.9 \times 10^4$ | 140 | $1.6 \times 10^0$ | $4.2 \times 10^4$ | $6.1 \times 10^0$ | 61% | $3.4 \times 10^1$ | 79% | $4.6 \times 10^1$ | 71% | $3.5 \times 10^1$ | 118% | | | $3.2 \times 10^0$ | 100% | $3.2 \times 10^0$ | $2.2 \times 10^1$ |
| 68 | $5.6 \times 10^2$ | 140 | $1.6 \times 10^0$ | $2.5 \times 10^3$ | $2.0 \times 10^0$ | 25% | $2.3 \times 10^0$ | 44% | $2.7 \times 10^0$ | 69% | $3.1 \times 10^0$ | 94% | | | $3.1 \times 10^0$ | 94% | $3.1 \times 10^0$ | $1.4 \times 10^4$ |
| 69 | $9.0 \times 10^2$ | 140 | $2.7 \times 10^0$ | $4.8 \times 10^4$ | $2.7 \times 10^0$ | 0% | $3.0 \times 10^0$ | 43% | $3.8 \times 10^0$ | 81% | $4.0 \times 10^0$ | 90% | | | $5.3 \times 10^0$ | 152% | $5.3 \times 10^0$ | $1.8 \times 10^4$ |
| 76 | $1.5 \times 10^4$ | 130 | $5.9 \times 10^0$ | $1.7 \times 10^5$ | $6.6 \times 10^0$ | 12% | $6.7 \times 10^0$ | 14% | $7.1 \times 10^0$ | 20% | | | $7.0 \times 10^0$ | 19% | | | $7.0 \times 10^0$ | $4.3 \times 10^3$ |
| 80 | $1.5 \times 10^3$ | 130 | $9.1 \times 10^0$ | $3.6 \times 10^3$ | $9.1 \times 10^0$ | 0% | $9.1 \times 10^0$ | 0% | $9.1 \times 10^0$ | 0% | | | $9.1 \times 10^0$ | 0% | | | $9.1 \times 10^0$ | $3.3 \times 10^2$ |
| 81 | $5.2 \times 10^2$ | 130 | $1.3 \times 10^1$ | $3.6 \times 10^4$ | $1.3 \times 10^1$ | 0% | $1.3 \times 10^1$ | 0% | $1.3 \times 10^0$ | 0% | | | $1.3 \times 10^1$ | 0% | | | $1.3 \times 10^0$ | $6.9 \times 10^2$ |
| 82 | $1.4 \times 10^5$ | 130 | $5.8 \times 10^0$ | $>1.6 \times 10^6$ | $6.2 \times 10^0$ | 7% | $6.7 \times 10^0$ | 16% | $7.6 \times 10^0$ | 31% | | | $7.6 \times 10^0$ | 31% | | | $7.6 \times 10^0$ | $1.4 \times 10^2$ |
| 83 | $3.4 \times 10^5$ | 140 | $7.1 \times 10^0$ | $>1.7 \times 10^6$ | $7.4 \times 10^0$ | 4% | $7.8 \times 10^0$ | 10% | $8.4 \times 10^0$ | 18% | | | $9.2 \times 10^0$ | 29% | | | $9.2 \times 10^0$ | $2.5 \times 10^3$ |
| 85 | $2.9 \times 10^3$ | 140 | $1.4 \times 10^0$ | $4.3 \times 10^3$ | $1.5 \times 10^0$ | 7% | $1.7 \times 10^0$ | 21% | $2.0 \times 10^0$ | 43% | $2.2 \times 10^0$ | 57% | | | $2.2 \times 10^0$ | 57% | $2.2 \times 10^0$ | $5.1 \times 10^3$ |
| 89 | $8.6 \times 10^1$ | 140 | $2.2 \times 10^0$ | $2.2 \times 10^5$ | $2.2 \times 10^0$ | 0% | $2.2 \times 10^0$ | 0% | $2.7 \times 10^0$ | 23% | $3.0 \times 10^0$ | 36% | | | $2.6 \times 10^0$ | 18% | $2.6 \times 10^0$ | $>8.4 \times 10^0$ |
| 90 | $8.4 \times 10^5$ | 140 | $1.3 \times 10^0$ | $1.5 \times 10^3$ | $2.2 \times 10^0$ | 69% | $2.9 \times 10^0$ | 123% | $3.4 \times 10^0$ | 161% | $5.2 \times 10^0$ | 300% | | | $3.9 \times 10^0$ | 200% | $3.9 \times 10^0$ | $7.6 \times 10^3$ |
| 91 | $3.0 \times 10^5$ | 140 | $2.0 \times 10^0$ | $>1.5 \times 10^6$ | $3.1 \times 10^0$ | 55% | $4.3 \times 10^0$ | 115% | $5.0 \times 10^0$ | 150% | $2.7 \times 10^0$ | 35% | | | $2.7 \times 10^0$ | 35% | $2.7 \times 10^0$ | $1.1 \times 10^6$ |
| 93 | $5.2 \times 10^4$ | 140 | $6.9 \times 10^1$ | $1.7 \times 10^4$ | $6.9 \times 10^1$ | 0% | $8.3 \times 10^{-1}$ | 20% | $1.0 \times 10^0$ | 45% | $1.0 \times 10^0$ | 45% | | | $1.0 \times 10^0$ | 45% | $1.0 \times 10^0$ | $1.3 \times 10^3$ |

TABLE IV.

ELECTRICAL BEHAVIOR OF PTC COMPOSITIONS AFTER EXPOSURE TO APPLIED VOLTAGE AGING TEST

| EXAMPLE NO. | 0 | 5 | | 10 | | 20 | | 30 | | 50 | |
|---|---|---|---|---|---|---|---|---|---|---|---|
| | $\rho$ | $\rho$ | Change | $\rho$ | Change | $\rho$ | Change | $\rho$ | Change | $\rho$ | Change |
| 16 | 1.5 | — | — | 1.6 | 7% | 1.8 | 20% | 1.9 | 27% | 2.1 | 40% |
| 40 | 1.5 | — | — | 1.7 | 13% | 1.9 | 27% | — | — | 2.2 | 47% |
| 52 | 3.0 | 4.8 | 60% | 6.4 | 113% | 8.8 | 193% | 10.0 | 233% | — | — |
| 54 | 3.5 | 3.7 | 6% | — | — | 3.8 | 9% | 4.0 | 14% | 5.2 | 49% |
| 56 | 3.7 | — | — | 5.0 | 35% | 5.5 | 49% | 5.9 | 59% | 6.5 | 76% |

TABLE V.

ELECTRICAL BEHAVIOR OF PTC COMPOSITIONS AFTER EXPOSURE TO APPLIED VOLTAGE AGING TEST

ELECTRICAL BEHAVIOR AFTER EXPOSURE (HOURS)

| EXAMPLE NO. | 0 | 5 | | 10 | | 20 | | 30 | | 50 | |
|---|---|---|---|---|---|---|---|---|---|---|---|
| | $\rho$ | $\rho$ | Change | $\rho$ | Change | $\rho$ | Change | $\rho$ | Change | $\rho$ | Change |
| 16 | 1.97 | 2.22 | 12% | 2.51 | 27% | 3.51 | 78% | 5.30 | 169% | 11.9 | 504% |
| 40 | 1.41 | 4.40 | 212% | 19.9 | 1311% | 54.3 | 3751% | 217 | 15290% | | |
| 54 | 2.63 | 3.15 | 20% | 3.16 | 20% | 3.35 | 27% | 4.05 | 54% | 5.67 | 116% |
| 56 | 3.07 | 3.39 | 10% | 3.43 | 12% | 3.61 | 18% | 4.03 | 31% | 5.17 | 68% |
| 63 | 2.86 | 3.84 | 34% | 7.67 | 168% | 30.2 | 756% | 69.8 | 2340% | 185 | 6368% |
| 65 | 1.82 | 2.46 | 35% | 2.47 | 36% | 2.59 | 42% | 3.12 | 71% | 3.60 | 98% |
| 85 | 1.24 | 2.97 | 139% | 8.53 | 587% | 19.6 | 1480% | 28.5 | 2198% | 98.9 | 7875% |
| 89 | 1.89 | SAMPLES BURNED DURING 1st POWER UP | | | | | | | | | |
| 90 | SAMPLES TOO BRITTLE FOR FABRICATION | | | | | | | | | | |
| 91 | 0.82 | 2.91 | 209% | 9.26 | 1029% | 13.6 | 1559% | 45.7 | 5473% | 597 | 72705% |
| 93 | 0.59 | 0.96 | 63% | 1.34 | 127% | 2.25 | 281% | 7.05 | 1093% | 13.4 | 2171% |

We claim:

1. A conductive polymer composition which exhibits PTC behavior with a switching temperature $T_s$ above 0° C., which has a resistivity of less than 7 ohm. cm at at least one temperature between $T_s$ and −40° C.; and which comprises (1) a polymer component having at least 10% crystallinity and (2) a particulate filler component which has been dispersed in said polymer component and which comprises carbon black having a particle size, D, which is from 20 to 150 millimicrons and a surface area, S, in m²/gram such that S/D is not more than 10; the amount of said filler component being such that the quantity $$\frac{S}{D} \times \frac{\text{volume of filler component}}{\text{volume of polymer component}}$$

is less than 1.

2. A composition according to claim 1 which has a peak resistivity of at least 1000 ohm. cm.

3. A composition according to claim 2 which has a peak resistivity of at least 10,000 ohm. cm.

4. A composition according to claim 2 wherein said quantity is less than 0.5.

5. A composition according to claim 4 wherein said quantity is less than 0.3.

6. A composition according to claim 2 which, after having been subjected to a thermal aging treatment which consists of maintaining the composition, by external heating thereof, for 25 hours at a temperature at which the resistivity of the composition is between 100 ohm. cm and the peak resistivity, (a) exhibits PTC behavior, (b) has a resistivity at at least one temperature between $T_s$ and −40° C. which is between 0.5 times and 2 times the resistivity at the same temperature before said thermal aging treatment, and (c) has a peak resistivity of at least 1000 ohm. cm.

7. A composition according to claim 6 which, after said thermal aging treatment, has, at all temperatures between $T_s$ and −40° C., a resistivity which is between 0.5 and 2 times the resistivity at the same temperature before said thermal aging treatment.

8. A composition according to claim 6 which, after having been subjected to a voltage aging treatment which consists of passing current through the composition for 25 hours so that I²R heating thereof maintains the composition at a temperature between $T_s$ and $(T_s+50)°$ C., (a) exhibits PTC behaviour, (b) has a resistivity at at least one temperature between $T_s$ and −40° C. which is between 0.5 times and 2 times the resistivity at the same temperature before said voltage aging treatment and (c) has a peak resistivity of at least 1000 ohm. cm.

9. A composition according to claim 8 which, after said voltage aging treatment has, at all temperatures within said range, a resistivity which is between 0.5 and 2 times the resistivity at the same temperature before said voltage aging treatment.

10. A composition according to claim 6 which further comprises at least 0.05% by weight of an additive which stabilises the composition against thermo-oxidative degradation.

11. A composition according to claim 2 wherein said polymeric component has at least 40% crystallinity and comprises at least one polymer selected from the group consisting of polyolefins, copolymers of at least one olefin and at least one polar comonomer, polyarylenes, polyesters, polyamides, polycarbonates and fluorine-containing polymers.

12. A composition according to claim 2 wherein said carbon black has a particle size of 20 to 75 millimicrons.

13. A composition according to claim 2 wherein the ratio by volume of the carbon black to the polymer component is at least 0.25.

14. A composition according to claim 2 which is substantially free from cross-linking.

15. A conductive polymer composition which exhibits PTC behavior with a switching temperature $T_s$ above 0° C., which has a resistivity of less than 7 ohm. cm at at least one temperature between $T_s$ and −40° C., and which, after having been subjected to a thermal aging treatment which consists of maintaining the composition, by external heating thereof, for 25 hours at a temperature at which the resistivity of the composition is between 100 ohm. cm and the peak resistivity,
  (a) exhibits PTC behavior, and
  (b) has a resistivity at at least one temperature between $T_s$ and −40° C. which is between 0.5 times and 2 times the resistivity of the composition at the same temperature before said thermal aging treatment,
and which composition comprises
  (1) a polymer component having at least 10% crystallinity and
  (2) a particulate filler component which has been dispersed in said polymer component and which comprises carbon black having a particle size, D, which is from 20 to 150 millimicrons and a surface area, S, in m$^2$/gram such that S/D is not more than 10.

16. A composition according to claim 15 which has a peak resistivity of at least 1000 ohm. cm.

17. A composition according to claim 16 which, after having been subjected to said thermal aging treatment, has, at all temperatures between $T_s$ and −40° C., a resistivity which is between 0.5 and 2 times the resistivity at the same temperature before said thermal aging treatment.

18. A composition according to claim 15 which, after having been subjected to a voltage aging treatment which consists of passing current through the composition for 25 hours so that $I^2R$ heating thereof maintains the composition at a temperature between $T_s$ and $(T_s+50)°$ C., (a) exhibits PTC behavior, (b) has a resistivity at at least one temperature between $T_s$ and −40° C. which is between 0.5 times and 2 times the resistivity at the same temperature before said voltage aging treatment and (c) has a peak resistivity of at least 1000 ohm. cm.

19. A composition according to claim 18 which, after having said voltage aging treatment has, at all temperatures within said range, a resistivity which is between 0.5 and 2 times the resistivity at the same temperature before said voltage aging treatment.

20. A claim according to claim 16 wherein said carbon black has a particle size of 20 to 75 millimicrons.

21. A conductive polymer composition which exhibits PTC behavior with a switching temperature, $T_s$, above 0° C., which has a resistivity of less than 7 ohm. cm at at least one temperature between $T_s$ and −40° C. and a peak resistivity of at least 1000 ohm. cm and which comprises
  (1) a polymer component having at least 10% crystallinity and
  (2) a particulate filter component which has been dispersed in said polymer component and which comprises carbon black having a particle size, D, which is from 20 to 150 microns and surface area, S, in m$^2$/gram such that S/D is not more than 10.

22. A composition according to claim 21 which has a resistivity of less than 2 ohm. cm at at least one temperature between $T_s$ and −40° C.

23. A composition according to claim 21 which has a peak resistivity of at least 10,000 ohm. cm.

24. A composition according to claim 21 wherein the amount of said filler component is such that the quantity $$\frac{S}{D} \times \frac{\text{volume of filler component}}{\text{volume of polymer component}}$$

is less than 1, and the ratio by volume of the carbon black to the polymer component is at least 0.25.

25. A composition according to claim 24 wherein the ratio by volume of the carbon black to the polymer component is at least 0.4.

26. An electrical device which comprises a melt-shaped PTC element and at least two electrodes which can be connected to a source of electrical power and which, when so connected, causes current to flow through said PTC element, said PTC element being composed of a PTC conductive polymer composition which comprises a polymer component having at least 10% crystallinity, and, dispersed in said polymer, a particular filler component which comprises a carbon black having a particle size, D, which is from 20 to 150 millimicrons and a surface area, S, in m$^2$/gram such that S/D is not more than 10; which composition
  (a) exhibits PTC behavior with a switching temperature $T_s$ and a peak resitivity of at least 1000 ohm. cm; and
  (b) has a resistivity of less than 7 ohm. cm in a temperature range which is between $T_s$ and the lower of 0° C. and $(T_s-50)°$ C.

27. A device according to claim 26 wherein said PTC composition, after said device has been subjected to a thermal aging treatment which consists of maintaining the device, by external heating thereof, for 25 hours at a temperature at which the resistivity of said composition is between 100 ohm. cm and the peak resistivity, (a) exhibits PTC behavior, (b) has a resitivity at at least one temperature between $T_s$ and −40° C. which is between 0.5 times and 2 times the resistivity at the same temperature before said thermal aging treatment, and (c) has a peak resistivity of at least 1000 ohm. cm.

28. A device according to claim 27 wherein said PTC composition, after said thermal treatment, has at all temperatures between $T_s$ and −40° C., a resistivity which is between 0.5 times and 2 times the resistivity at the same temperature before said thermal aging treatment.

29. A device according to claim 27 wherein said PTC composition after said device has been subjected to a voltage aging treatment which consists of passing current through the device for 25 hours so that $I^2R$ heating of the device maintains said PTC element at a temperature between $T_s$ and $(T_s+50)°$ C., (a) exhibits PTC behavior, (b) has a resistivity at at least one temperature between $T_s$ and −40° C. which is between 0.5 times and 2 times the resistivity at the same temperature before said voltage aging treatment, and (c) has a peak resistivity of at least 1000 ohm. cm.

30. A device according to claim 29 wherein said PTC composition, after said voltage aging treatment, has at all temperatures between $T_s$ and −40° C., a resistivity which is between 0.5 times and 2 times the resistivity at the same temperature before said voltage aging treatment.

31. An electrical device according to claim 27 wherein the amount of said filler component is such that the quantity $$\frac{S}{D} \times \frac{\text{volume of filler component}}{\text{volume of polymer component}}$$

is less than 1.

32. A device according to claim 31 wherein said quantity is less than 0.5.

33. A device according to claim 31 wherein the ratio by volume of said carbon black to said polymer component is at least 0.25.

34. A device according to claim 33 wherein said ratio is at least 0.40.

35. A process for the preparation of shaped article of a conductive polymer composition, which process comprises
   (1) providing
      (a) a polymer component having at least 10% crystallinity; and
      (b) a filler component which comprises a carbon black having a particle size, D, which is from 20 to 150 millimicronsand a surface area, S, in m²/gram such that S/D is not more than 10, and
   (2) preparing a composition which comprises a dispersion of said carbon black in said polymer component by a process which comprises dispersing said carbon black in said polymer component while said polymer component is molten; and
   (3) melt-shaping said dispersion; the total energy used in preparing and melt-shaping said dispersion being from 1 to 300 hp. hr. ft.$^{-3}$ and being selected so that the product
      (a) exhibits PTC behavior with a switching temperature $T_s$ above 0° C. and a peak resistivity of at least 1000 ohm. cm; and
      (b) has a resistivity of less that 7 ohm. cm at at least one temperature between $T_s$ and −40° C.

36. A process according to claim 35 wherein the total energy used in preparing and melt-shaping said dispersion is from 1 to 100 hp. hr. ft$^{-3}$.

37. A process according to claim 36 wherein said total energy is from 1 to 50 hp. Hr. ft$^{-3}$.

38. A process according to claim 37 wherein said total energy is from 1 to 25 hp. hr. ft$^{-3}$.

39. A composition according to claim 2 wherein said polymeric component consists essentially of a polymer selected from the group consisting of polyethylene, copolymers of ethylene and ethyl acrylate, copolymers of ethylene and acrylic acid, polyesters, polyamides, polyethers, polycaprolactone, fluorinated ethylene/propylene copolymer, polyvinylidene fluoride, mixtures of polyethylene and a copolymer of ethylene and ethyl acrylate, and mixtures of polyethylene and a copolymer of ethylene and acrylic acid.

40. A composition according to claim 16 wherein said polymeric component consists essentially of a polymer selected from the group consisting of polyethylene, copolymers of ethylene and ethyl acrylate, copolymers of ethylene and acrylic acid, polyesters, polyamides, polyethers, polycaprolactone, fluorinated ethylene/propylene copolymer, polyvinylidene fluoride, mixtures of polyethylene and a copolymer of ethylene and ethyl acrylate, and mixtures of polyethylene and a copolymer of ethylene and acrylic acid.

41. A composition according to claim 21 wherein said polymeric component consists essentially of a polymer selected from the group consisting of polyethylene, copolymers of ethylene and ethyl acrylate, copolymers of ethylene and acrylic acid, polyesters, polyamides, polyethers, polycaprolactone, fluorinated ethylene/propylene copolymer, polyvinylidene fluoride, mixtures of polyethylene and a copolymer of ethylene and ethyl acrylate, and mixtures of polyethylene and a copolymer of ethylene and acrylic acid.

42. A conductive polymer composition which exhibits PTC behavior with a switching temperature $T_s$ above 0° C., which has a resistivity of less than 7 ohm. cm at at least one temperature between $T_s$ and −40° C.; and which comprises
   (1) a polymer component having at least 10% crystallinity; and
   (2) a particulate filler component which has been dispersed in said polymer component and which comprises carbon black having a particle size, D, which is from 20 to 150 millimicrons and a surface area, S, in m²/grams such that S/D is not more than 10.

43. An electrical device which comprises a melt-shapedPTC element and at least two electrodes which can be connected to a source of electrical power and which, when so connected, cause current to flow through said PTC element, said PTC element being composed of a conductive polymer composition which exhibits PTC behavior with a switching temperature $T_s$ above 0° C., which has a resistivity of less than 7 ohm. cm at at least one temperature between $T_s$ and −40 C., and which comprises
   (1) a polymer component having at least 10% crystallinity; and
   (2) a particulate filler component which has been dispersed in said polymer component and which comprises carbon black having a particle size D, which is from 20 to 150 millimicrons and a surface area, S, in m²/grams such that S/D is not more than 10.

* * * * *